(12) United States Patent
Tachiwa

(10) Patent No.: US 11,581,759 B2
(45) Date of Patent: Feb. 14, 2023

(54) POWER RECEPTION APPARATUS, CONTROL METHOD, AND STORAGE MEDIUM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 182 days.

(21) Appl. No.: 16/867,135

(22) Filed: May 5, 2020

(65) Prior Publication Data

US 2020/0366136 A1    Nov. 19, 2020

(30) Foreign Application Priority Data

May 14, 2019 (JP) .............................. JP2019-091383
Feb. 13, 2020 (JP) .............................. JP2020-022904

(51) Int. Cl.
  *H02J 50/80*   (2016.01)
  *H02J 7/00*    (2006.01)
  *H02J 50/90*   (2016.01)

(52) U.S. Cl.
  CPC .......... *H02J 50/80* (2016.02); *H02J 7/00045* (2020.01); *H02J 50/90* (2016.02); *H02J 2310/22* (2020.01); *H02J 2310/48* (2020.01)

(58) Field of Classification Search
  CPC .................................................. H02J 7/00045
  USPC ....................................................... 320/108
  See application file for complete search history.

(56) References Cited

U.S. PATENT DOCUMENTS

| 8,760,112 B2* | 6/2014 | Kuroiwa ................. B60L 58/20 320/109 |
| 11,005,294 B2* | 5/2021 | Kang ....................... H02J 50/12 |
| 2013/0257365 A1* | 10/2013 | Redding ............. H02J 7/00036 320/108 |
| 2016/0064959 A1* | 3/2016 | Jung .................... H02J 7/00036 320/162 |
| 2019/0272943 A1* | 9/2019 | Leem ........................ H02J 7/02 |
| 2019/0356153 A1* | 11/2019 | Wan ..................... H02J 7/00041 |
| 2021/0399568 A1* | 12/2021 | Huang .................. G06F 3/0482 |
| 2022/0006312 A1* | 1/2022 | Zhang ................... H02J 7/0047 |

FOREIGN PATENT DOCUMENTS

| JP | 2010-104097 A | 5/2010 |
| JP | 2016-007116 A | 1/2016 |
| WO | WO-2019113738 A1 * | 6/2019 ................ H02J 7/00 |

* cited by examiner

*Primary Examiner* — Edward Tso
*Assistant Examiner* — Ahmed H Omar
(74) *Attorney, Agent, or Firm* — Canon U.S.A., Inc. IP Division

(57) ABSTRACT

A power reception apparatus performs device authentication on a power transmission apparatus, and performs control to request first power of the power transmission apparatus in a case where the power transmission apparatus fails the device authentication and to request second power higher than the first power of the power transmission apparatus in a case where the power transmission apparatus successfully passes the device authentication. In addition, the power reception apparatus sets a setting to permit requesting the second power of a power transmission apparatus which does not have a function for responding to the device authentication.

15 Claims, 21 Drawing Sheets

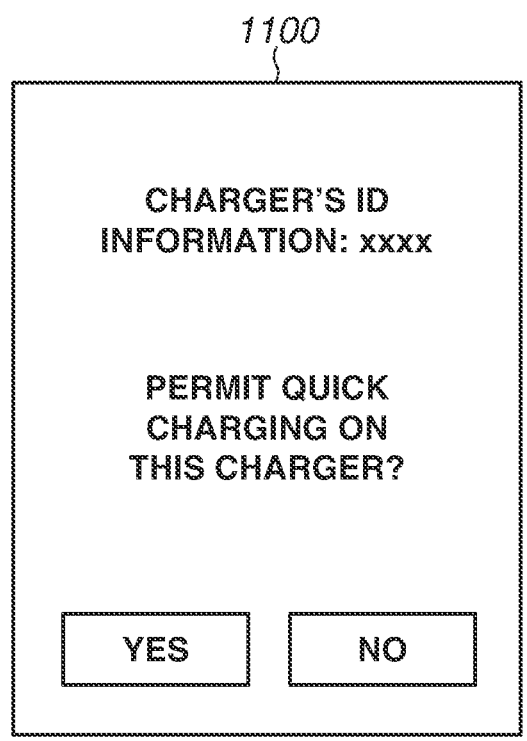

QUICK CHARGING CAN BE UNAVAILABLE FOR DEVICE THAT PERFORMS DEVICE AUTHENTICATION ON CHARGER.

POWER RECEPTION APPARATUS, CONTROL METHOD, AND STORAGE MEDIUM

BACKGROUND OF THE INVENTION

Field of the Invention

The present disclosure relates to a power reception apparatus, a control method, and a storage medium.

Description of the Related Art

A wide variety of wireless power transfer systems, such as a wireless charging system, have been under technological development in recent years. Japanese Patent Application Laid-Open No. 2016-007116 discusses a power transmission apparatus and a power reception apparatus compliant with the standard formulated by a wireless charging standardization organization Wireless Power Consortium (WPC) (hereinafter, referred to as "WPC standard").

Japanese Patent Application Laid-Open No. 2010-104097 discusses device authentication between a power transmission apparatus and a power reception apparatus that perform wireless charging, and transferring power from the power transmission apparatus to the power reception apparatus if the device authentication is successful.

SUMMARY OF THE INVENTION

An example of a method for performing power transfer based on the result of a device authentication includes permitting, in a case where device authentication on the power transmission apparatus is successful, transfer of power higher than power that is permitted to be transferred in a case where the device authentication fails. If a power transmission apparatus does not have a function for responding to a device authentication, however, device authentication is unable to be performed on the power transmission apparatus, and accordingly, a user's convenience can be impaired since high power is unable to be received from the power transmission apparatus.

Various embodiments of the present disclosure are directed to enabling reception of high power even from a power transmission apparatus which does not have a function for responding to a device authentication, as though the power transmission apparatus had been successful in device authentication.

According to one embodiment of the present disclosure, a power reception apparatus includes a reception unit configured to wirelessly receive power from a power transmission apparatus, an authentication unit configured to perform device authentication on the power transmission apparatus based on information obtained from the power transmission apparatus, a control unit configured to perform control to request first power of the power transmission apparatus in a case where the power transmission apparatus fails the device authentication, and request second power higher than the first power of the power transmission apparatus in a case where the power transmission apparatus successfully passes the device authentication and a setting unit configured to set a setting to permit requesting the second power of a power transmission apparatus which does not have a function for responding to the device authentication.

According to another embodiment of the present disclosure, a method for controlling a power reception apparatus configured to control reception of power lower than or equal to first power from a power transmission apparatus failed in device authentication, and permission of reception of second power higher than the first power from a power transmission apparatus successful in the device authentication, the method includes performing a setting to permit the reception of the second power without the device authentication, and controlling the permission of the reception of the second power from a power transmission apparatus which does not have a function of performing communication for the device authentication, based on the setting.

Further features will become apparent from the following description of exemplary embodiments with reference to the attached drawings.

BRIEF DESCRIPTION OF THE DRAWINGS

FIG. 11 is a diagram illustrating an example of a user interface of the power reception apparatus according to the first exemplary embodiment.

FIG. 21 is a diagram illustrating an example of display by the power transmission apparatus according to the sixth exemplary embodiment.

DESCRIPTION OF THE EMBODIMENTS

Exemplary embodiments of the present disclosure will be described below with reference to the drawings. The following exemplary embodiments are only examples for describing the technical concept of the present disclosure, and the present disclosure is not intended to be limited to the configurations and methods described in the exemplary embodiments.

(System Configuration)

Figure 1:
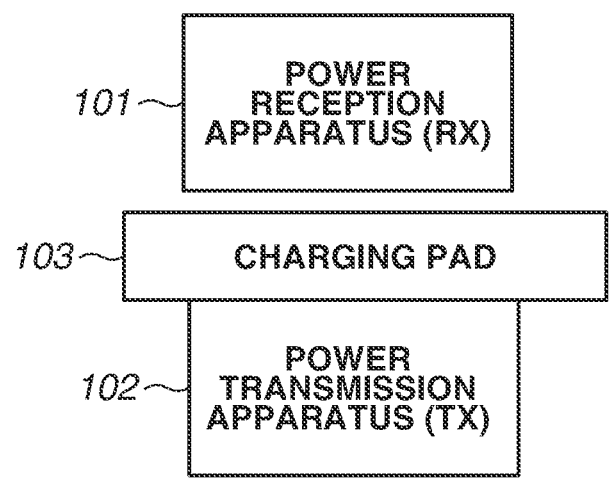
FIG. 1 is a diagram illustrating a configuration of a wireless charging system.

FIG. 1 illustrates a configuration example of a wireless charging system (wireless power transfer system) according to a first exemplary embodiment. The wireless charging system includes a power reception apparatus 101 and a power transmission apparatus 102. A power reception apparatus may hereinafter be referred to as an RX, and a power transmission apparatus as a TX. The TX 102 is an electronic device that wirelessly transmits power to the RX 101 placed on a charging pad 103. The RX 101 is an electronic device that receives the power wirelessly transmitted from the TX 102 and charges a built-in battery. The following description will be given by using a case where the RX 101 is placed on the charging pad 103 as an example. However, the TX 102 can transmit power to the RX 101 not placed on the charging pad 103, as long as the RX 101 is within a power transmission coverage of the TX 102.

The RX 101 receives up to 15 W or up to 5 W of power from the TX 102. In receiving up to 15 W of power, the RX 101 can be fully charged in a duration shorter than a duration in receiving up to 5 W of power. In the description of the present exemplary embodiment, receiving up to 15 W of power may be referred to as "quick charging". The RX 101 and the TX 102 can have a function of executing an application other than a wireless charging application. An example of the RX 101 is a smartphone. An example of the TX 102 is an accessory device for charging the smartphone. The RX 101 and the TX 102 may be storage devices such as a hard disk drive and a memory device, or information processing apparatuses such as a personal computer (PC). Examples of the RX 101 and the TX 102 may include image input apparatuses such as an imaging apparatus (camera or video camera) and a scanner, and image output apparatuses such as a printer, a copying machine, and a projector. The TX 102 may be a smartphone. In such a case, the RX 101 may be another smartphone or a wireless earphone. The RX 101 may be a vehicle such as an automobile, and the TX 102 may be a charger installed on a console of the automobile.

While each of the RX 101 and the TX 102 is described as a single device in the present exemplary embodiment, the present exemplary embodiment is also applicable to a configuration where a plurality of the RXes 101 receives power transmitted from the TX 102 or each receives from a different one of a plurality of the TXes 102.

In this wireless charging system, wireless power transfer using an electromagnetic induction method for wireless charging is performed based on the Wireless Power Consortium (WPC) standard. Specifically, the RX 101 and the TX 102 perform wireless power transfer for wireless charging based on the WPC standard between a power reception coil of the RX 101 and a power transmission coil of the TX 102. The wireless power transfer method applied to the wireless charging system is not limited to one defined in the WPC standard, and other electromagnetic induction methods, magnetic field resonance methods, electric field resonance methods, microwave methods, and laser-based methods may be used. While, in the present exemplary embodiment, the wireless power transfer is used for wireless charging, the wireless power transfer may be performed for purposes other than wireless charging.

According to the WPC standard, the magnitude of power guaranteed when the RX 101 receives power from the TX 102 is defined by a value called Guaranteed Power (GP). The GP indicates the value of the power guaranteed to be output to a load (for example, a charging circuit) of the RX 101 even if, for example, a positional relationship between the RX 101 and the TX 102 changes and the power transmission efficiency between the power reception coil and the power transmission coil drops. For example, if the GP is 5 W, the TX 102 controls power transmission so that 5 W can be output to the load in the RX 101 even if the positional relationship between the power reception coil and the power transmission coil changes and the power transmission efficiency drops. The GP is the upper limit value of power receivable from the TX 102, and the RX 101 can receive power lower than or equal to the determined GP from the TX 102. The RX 101 and the TX 102 according to the present exemplary embodiment perform communication for power transmission and reception control based on the WPC standard and communication for device authentication. The communication for power transmission and reception control based on the WPC standard will initially be described. The WPC standard defines a plurality of phases, including a power transfer phase where power transfer is executed and phases before the power transfer is actually executed. In each of the phases, communication for power transmission and reception control is performed. The phases before power transfer include a selection phase, a ping phase, an identification and configuration phase, a negotiation phase, and a calibration phase. In the following description, the identification and configuration phase will be referred to as I&C phase.

In the selection phase, the TX 102 intermittently transmits an analog ping to detect that an object is placed on the charging pad 103 (for example, that the RX 101 or a piece of conductor is placed on the charging pad 103). The TX 102 detects at least either a voltage value or a current value of the transmission coil when an analog ping is transmitted. If the voltage value falls below a threshold or the current value exceeds a threshold, the TX 102 determines that there is an object, and transitions to the ping phase.

In the ping phase, the TX 102 transmits a Digital Ping at higher power than that of an analog ping. The power of the Digital Ping has a sufficient magnitude to activate a control unit of the RX 101 placed on the charging pad 103. The RX 101 notifies the TX 102 of the magnitude of the received voltage (received voltage value). The TX 102 receives a response from the RX 101 receiving the Digital Ping, and therefore the TX 102 recognizes that the object detected in the selection phase is the RX 101. The TX 102 notified of the received voltage value transitions to the I&C phase.

In the I&C phase, the TX 102 identifies the RX 101 and obtains device configuration information (capability information) from the RX 101. For that purpose, the RX 101 transmits an Identification (ID) Packet and a Configuration Packet to the TX 102. The ID Packet includes ID information about the RX 101. The Configuration Packet includes the device configuration information (capability information) about the RX 101. Receiving the ID Packet and the Configuration Packet, the TX 102 responds with an Acknowledge (ACK) Response (hereinafter, referred to as an "ACK"). The I&C phase ends.

In the calibration phase, the RX 101 notifies the TX 102 of the received power value based on the WPC standard. The TX 102 performs adjustments for efficient power transmission.

In the power transfer phase, the RX 101 and the TX 102 perform control for starting power transmission, continuing power transmission, and stopping power transmission due to an error or a full charge.

The TX 102 and the RX 101 perform communication for such power transmission and reception control by communications where a signal is superposed on the transmitted power, using the same antennas (coils) as with the wireless power transfer, based on the WPC standard. The communication coverage where the TX 102 and the RX 101 can communicate the signal superposed on the transmitted power is substantially the same as the power transmission coverage of the TX 102.

The RX 101 according to the present exemplary embodiment performs challenge-response communication using an electronic certificate with the TX 102 and performs device authentication on the TX 102 before determination of the GP. In other words, the RX 101 performs communication for device authentication. The RX 101 then determines the value of the GP to request of the TX 102 in the foregoing negotiation phase based on the result of the device authentication.

The RX 101 requests the TX 102 successful in the device authentication to set the GP to 15 W, and request the TX 102 failed in the device authentication to set the GP to 5 W. The combination of the GPs is not limited to 15 W and 5 W, and any combination of values may be used as long as the GP of the TX 102 successful in the device authentication is set higher than that of the TX 102 failed in the device authentication. In other words, the RX 101 requests that power transmission and reception with a high GP be performed with only the TX 102 successful in the device authentication. The above described determination of the GP based on the result of the device authentication can allow power reception with a high GP only from the TX 102 that has passed a predetermined test defined in the WPC standard and of which safety is guaranteed.

If the TX 102 does not have a function for responding to the device authentication, the RX 101 determines the value of the GP to be set from 15 W and 5 W, based on information additionally set by a user. Description of processing for the determination will be given below.

In the present exemplary embodiment, the RX 101 and the TX 102 are described to perform the communication for device authentication by a communication method using the same antennas as during wireless power transfer, like when doing the communication for power transmission and reception control. However, the communication for power transmission and reception control and the communication for device authentication may be performed by different communication methods. For example, the communications may be performed by using a wireless local area network (LAN) compliant with the Institute of Electrical and Electronics Engineers (IEEE) 802.11 standard series (for example, Wi-Fi (registered trademark)), Bluetooth®, ZigBee, and/or near field communication (NFC).

(Apparatus Configuration)

Next, a configuration of the power reception apparatus 101 (RX 101) and the power transmission apparatus 102 (TX 102) according to the present exemplary embodiment will be described. The components described below are just an example. Part (or in some cases, all) of the following components may be replaced with other components providing similar other functions, or may even be omitted. New components may be added to the following components. One block described below may be divided into a plurality of blocks, and a plurality of blocks may be integrated into one.

Figure 2:
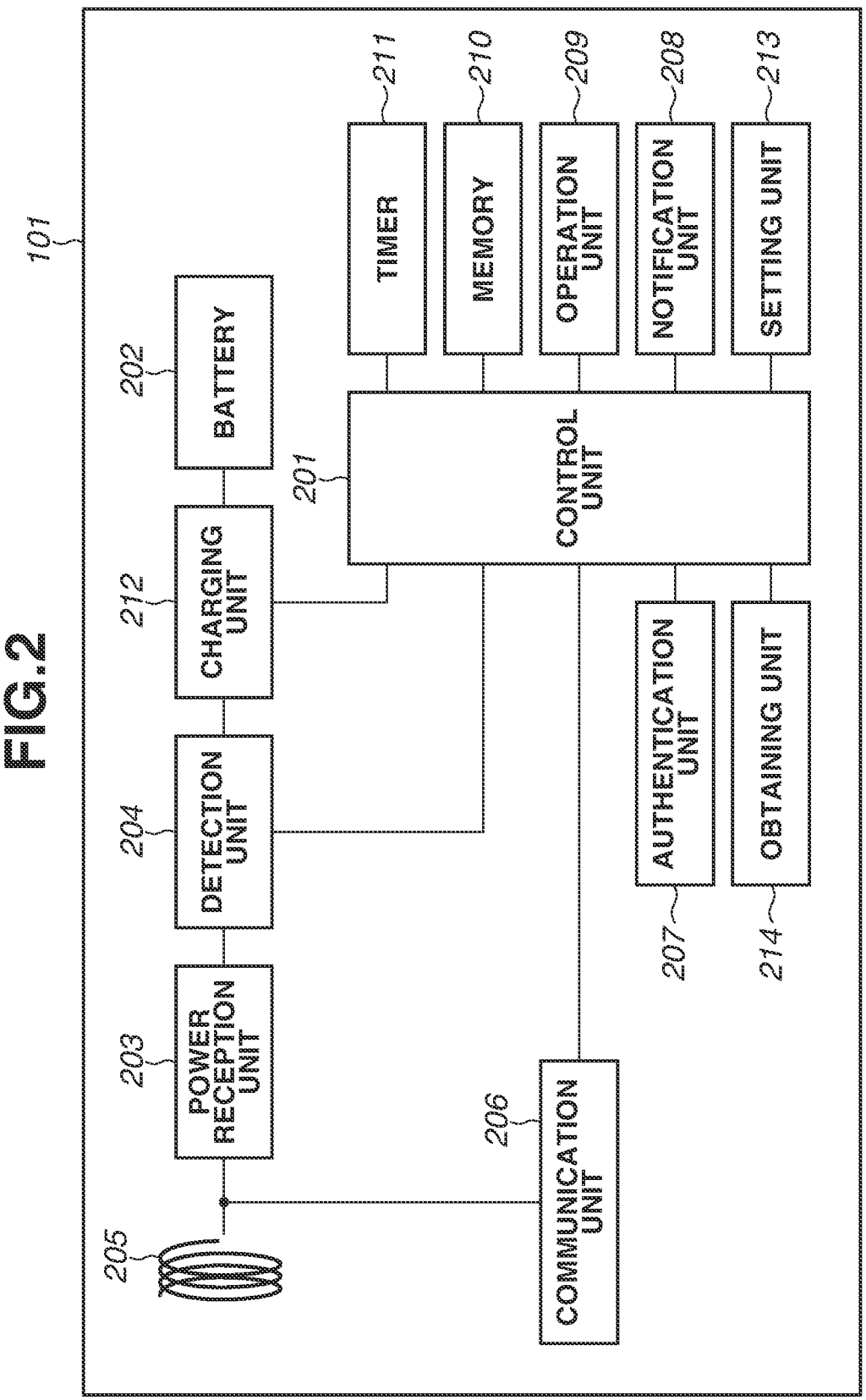
FIG. 2 is a diagram illustrating a configuration example of a power reception apparatus according to a first exemplary embodiment.

FIG. 2 is a diagram illustrating a configuration example of the RX 101 according to the present exemplary embodiment. The RX 101 includes a control unit 201, a battery 202, a power reception unit 203, a detection unit 204, a power reception coil 205, a communication unit 206, an authentication unit 207, a notification unit 208, an operation unit 209, a memory 210, a timer 211, a charging unit 212, a setting unit 213, and an obtaining unit 214.

The control unit 201 controls the entire RX 101, for example, by executing a control program stored in the memory 210. In other words, the control unit 201 controls the functional units illustrated in FIG. 2. The control unit 201 also performs control related to power reception control including communication for device authentication by the RX 101. The control unit 201 may further perform control for executing an application other than a wireless power transfer application. The control unit 201 includes one or more processors such as a central processing unit (CPU) and a microprocessing unit (MPU). The control unit 201 may include hardware dedicated to specific processing, such as an application specific integrated circuit (ASIC). The control unit 201 may include an array circuit complied to execute predetermined processing, such as a field-programmable gate array (FPGA). The control unit 201 stores information to be store during execution of various types of processing in the memory 210. The control unit 201 can measure time by using the timer 211.

The battery 202 supplies the entire RX 101 with power for control of the RX 101 by the control unit 201, power reception, and communication. The battery 202 stores power received via the power reception coil 205.

Electromagnetic waves radiated from a power transmission coil 305 of the TX 102 cause an induced electromotive force in the power reception coil 205. The power reception unit 203 obtains power generated in the power reception coil 205. The power reception unit 203 obtains alternating-current power generated by electromagnetic induction in the power reception coil 205. The power reception unit 203 then converts the alternating-current power into direct-current power or alternating-current power having a predetermined frequency, and outputs the power to the charging unit 212 that performs processing for charging the battery 202. In other words, the power reception unit 203 supplies the power to the load in the RX 101. The foregoing GP indicates the value of the power guaranteed to be output from the power reception unit 203.

The detection unit 204 detects that the RX 101 is placed on the charging pad 103 based on the WPC standard. For example, the detection unit 204 detects at least either the voltage value or the current value of the power reception coil 205 when the power reception unit 203 receives a Digital Ping compliant with the WPC standard via the power reception coil 205. If, for example, the voltage value falls below a predetermined voltage threshold or the current value exceeds a predetermined current threshold, the detection unit 204 can determine that the RX 101 is placed on the charging pad 103.

The communication unit 206 performs the foregoing control communication based on the WPC standard with the TX 102. The communication unit 206 communicates with the TX 102 by demodulating electromagnetic waves input from the power reception coil 205 to obtain information transmitted from the TX 102 and performing load modulation on the electromagnetic waves to superpose information to be transmitted to the TX 102 on the electromagnetic waves. In other words, the communication by the communication unit 206 is performed as superposed on the electromagnetic waves transmitted from the power transmission coil 305 of the TX 102.

The authentication unit 207 performs communication for device authentication with the TX 102 by using the communication unit 206, and performs device authentication on the TX 102. In the present exemplary embodiment, the device authentication refers to authentication using information about the foregoing electronic certificate. The authentication unit 207 may also have a function for responding to device authentication by the TX 102.

The notification unit 208 notifies the user of information by using a visual, aural, and/or tactile technique(s). For example, the notification unit 208 notifies the user of a charging state of the RX 101 and a state related to power transfer in the wireless power transfer system including the TX 102 and the RX 101 such as illustrated in FIG. 1. For example, the notification unit 208 includes a liquid crystal display, a light-emitting diode (LED), a speaker, a vibration generation circuit, and/or other notification devices.

The operation unit 209 has an acceptance function of accepting the user's operations on the RX 101. For example, the operation unit 209 includes a button, a keyboard, an audio input device such as a microphone, a motion detection device such as an acceleration sensor and a gyro sensor, and/or other input devices. A device where the notification unit 208 and the operation unit 209 are integrated, such as a touch panel, may be used.

The memory 210 stores various types of information, such as ID information and device configuration information, and control programs as described above. The memory 210 may store information obtained by a functional unit different from the control unit 201. The timer 211 clocks time. Examples of the timer 211 include a count-up timer that measures time elapsed from the time of activation, and a countdown timer that counts down from a set time.

The charging unit 212 charges the battery 202 with the power supplied from the power reception unit 203. The charging unit 212 starts and stops charging the battery 202 based on control from the control unit 201, and further adjusts the power to be used for charging the battery 202 based on the charging state of the battery 202. If the power used by the charging unit 212 changes, the power supplied from the power reception unit 203, i.e., the received power of the RX 101 also changes accordingly. Here, the charging unit 212 serves as the load in the RX 101.

The setting unit 213 performs control to cause the user to set a setting for processing of a case where the TX 102 is unable to receive device authentication by the authentication unit 207, and store the setting. The obtaining unit 214 obtains information about whether the TX 102 has the function for responding to device authentication by the TX 102 by using the communication unit 206.

Figure 3:
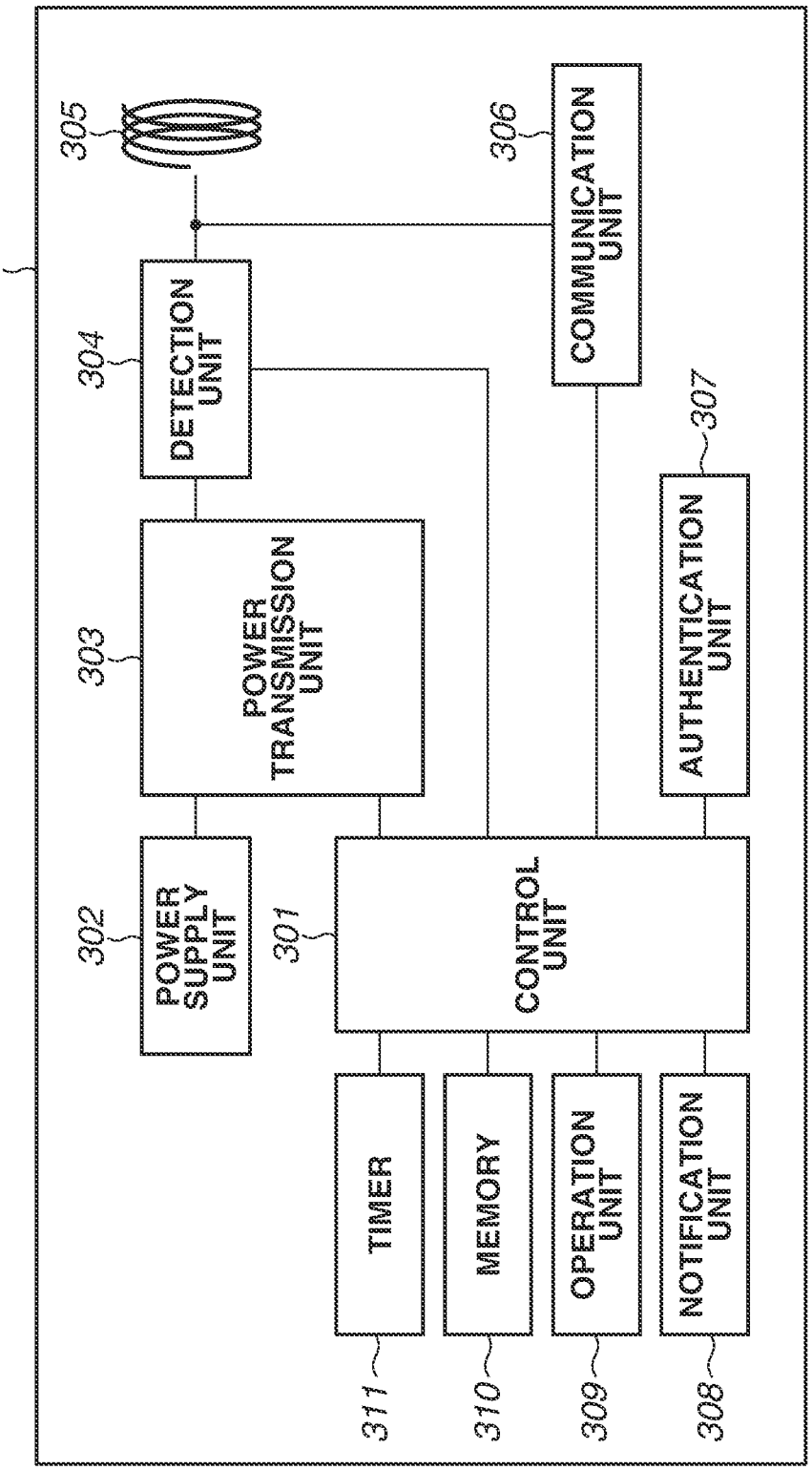
FIG. 3 is a diagram illustrating a configuration example of a power transmission apparatus according to the first exemplary embodiment.

FIG. 3 is a diagram illustrating a configuration example of the TX 102 according to the present exemplary embodiment. For example, the TX 102 includes a control unit 301, a power supply unit 302, a power transmission unit 303, a detection unit 304, the power transmission coil 305, a communication unit 306, an authentication unit 307, a notification unit 308, an operation unit 309, a memory 310, and a timer 311.

The control unit 301 controls the entire TX 102, for example, by executing a control program stored in the memory 310. In other words, the control unit 301 controls the functional units illustrated in FIG. 3. The control unit 301 also performs control related to power transmission control including communication for device authentication by the TX 102. The control unit 301 may further perform control for executing an application other than a wireless power transfer application. The control unit 301 includes one or more processors such as a CPU and an MPU. The control unit 301 may include hardware dedicated to specific processing, such as an ASIC, and/or an array circuit complied to execute predetermined processing, such as an FPGA. The control unit 301 stores information to be stored during execution of various types of processing in the memory 310. The control unit 301 can measure time by using the timer 311.

The power supply unit 302 supplies the entire TX 102 with power for controlling of the TX 102 by the control unit 301, power transmission, and communication. Examples of the power supply unit 302 include a commercial power supply and a battery. The battery stores power supplied from the commercial power supply.

The power transmission unit 303 converts direct- or alternating-current power input from the power supply unit 302 into alternating-current frequency power in a frequency band that is used for wireless power transfer. The power transmission unit 303 inputs the alternating-current frequency power to the power transmission coil 305, to generate electromagnetic waves for power to be received by the RX 101. The alternating-current frequency power generated by the power transmission unit 303 has a frequency of, for example, around several hundreds of kilohertz (e.g., 110 kHz to 205 kHz). The power transmission unit 303 inputs the alternating-current frequency power to the power transmission coil 305, based on instructions from the control unit 301, so that electromagnetic waves for transmitting power to the RX 101 are output from the power transmission coil 305. The power transmission unit 303 also controls the intensity of the electromagnetic waves to be output by adjusting either one or both of the voltage (power transmission voltage) and current (power transmission current) input to the power transmission coil 305. The higher the power transmission voltage and/or the power transmission current, the intensity of the electromagnetic waves gets higher. The lower the power transmission voltage and/or the power transmission current, the intensity of the electromagnetic waves gets lower. The power transmission unit 303 also performs output control on the alternating-current frequency voltage so that the power transmission from the power transmission coil 305 is started or stopped based on instructions from the control unit 301.

The detection unit 304 detects whether an object is placed on the charging pad 103 based on the WPC standard. Specifically, the detection unit 304 detects whether an object is placed on an interface surface of the charging pad 103. For example, the detection unit 304 detects at least either the voltage value or the current value of the power transmission coil 305 when the power transmission unit 303 transmits an analog ping compliant with the WPC standard via the power transmission coil 305. The detection unit 304 may detect a change in impedance. If the voltage value falls below a predetermined voltage value or the current value exceeds a predetermined current value, the detection unit 304 can determine that an object is placed on the charging pad 103. Whether the object is a power reception apparatus or other foreign object is determined based on the presence or absence of a predetermined response to a Digital Ping subsequently transmitted from the communication unit 306 by communication. More specifically, if the TX 102 receives a predetermined response, the object is determined to be a power reception apparatus. If not, the object is determined to not be a power reception apparatus.

The communication unit 306 performs the foregoing communication control based on the WPC standard with the RX 101. The communication unit 306 transmits information to and communicates with the RX 101 by modulating the electromagnetic waves that are output from the power transmission coil 305. The communication unit 306 obtains information transmitted from the RX 101 by demodulating electromagnetic waves that are output from the power transmission coil 305 and modulated by the RX 101. In other words, the communication by the communication unit 306 is performed by being superposed on the electromagnetic waves that are transmitted from the power transmission coil 305.

The authentication unit 307 performs communication for device authentication with the RX 101 by using the communication unit 306, to receive device authentication by the RX 101. The authentication unit 307 may also have a function of performing device authentication on the RX 101. In the present exemplary embodiment, the device authentication refers to authentication using the foregoing electronic certificate.

The notification unit 308 notifies the user of information by using a visual, aural, and/or tactile technique(s). For example, the notification unit 308 notifies the user of information indicating the charging state of the TX 102 and the state related to the power transfer of the wireless power transfer system including the TX 102 and the RX 101 such as illustrated in FIG. 1. For example, the notification unit 308 includes a liquid crystal display, an LED, a speaker, a vibration generation circuit, and/or other notification devices.

The operation unit 309 has a receiving function of receiving the user's operations on the TX 102. For example, the operation unit 309 includes a button, a keyboard, an audio input device such as a microphone, a motion detection device such as an acceleration sensor and a gyro sensor, and/or other input devices. A device where the notification unit 308 and the operation unit 309 are integrated, such as a touch panel, may be used.

The memory 310 stores various types of information and control programs. The memory 310 may store information obtained by a functional unit different from the control unit 301. The timer 311 clocks time. Examples of the timer 311 include a count-up timer that measures time elapsed from the time of activation, and a countdown timer that counts down from a set time.

Figure 4:
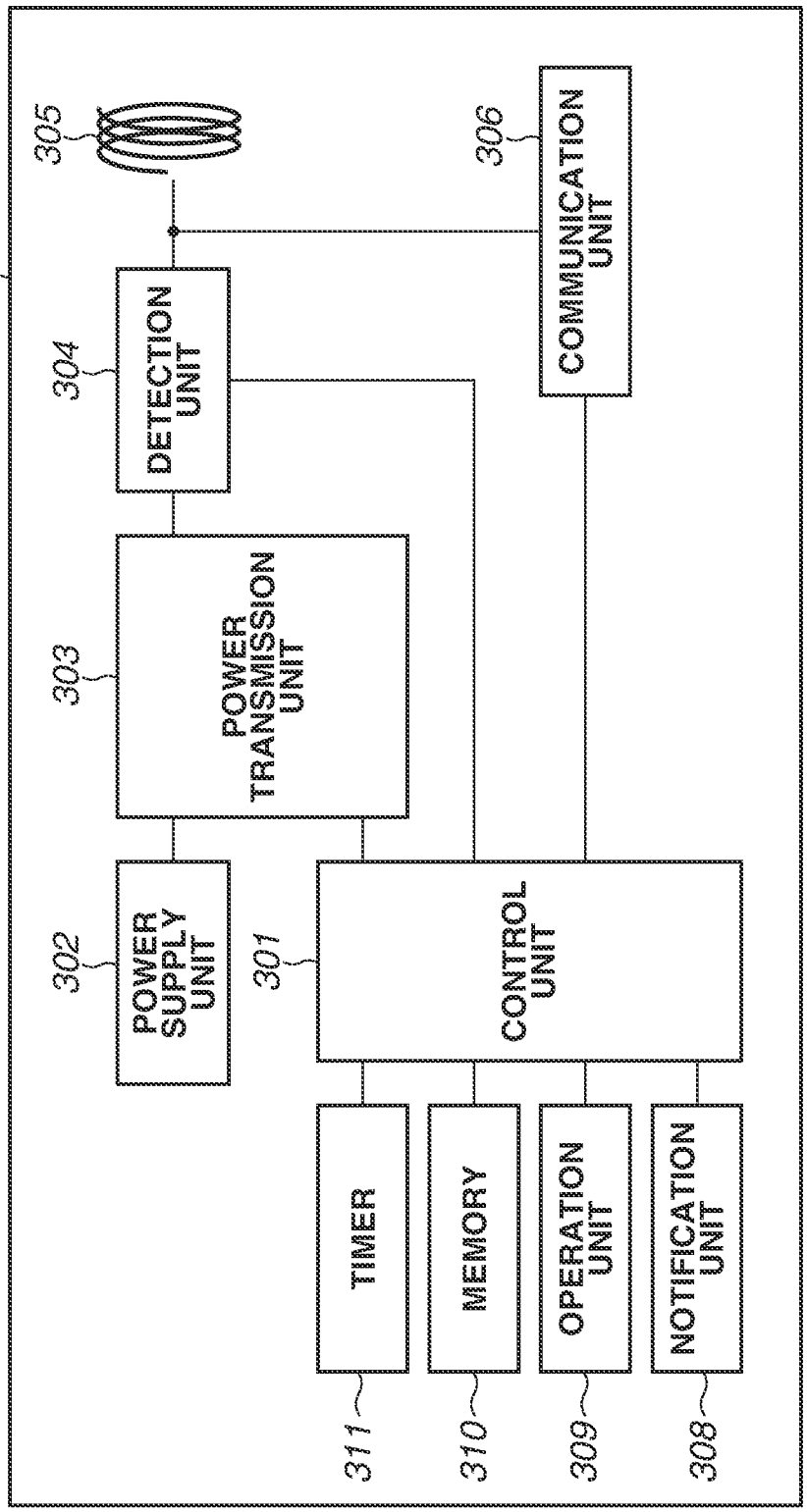
FIG. 4 is a diagram illustrating a configuration example of another power transmission apparatus according to the first exemplary embodiment.

FIG. 4 is a diagram illustrating a configuration example of another power transmission apparatus, a TX 402, according to the present exemplary embodiment. The TX 402 differs from the TX 102 illustrated in FIG. 3 in the absence of an authentication unit. The TX 402 does not have the function of performing communication for device authentication or the function of performing device authentication. In other words, the TX 402 has neither the function for responding to device authentication by the RX 101 nor the function of performing device authentication on the RX 101. While the TX 402 here is described to not have the device authentication functions themselves, the TX 402 may be one not having the function for responding to device authentication. For example, the TX 402 may be configured to have the function of performing communication for device authentication itself and be capable of performing device authentication on the RX 101 but not capable of responding to device authentication by the RX 101. In other respects, the configuration is similar to that of the TX 102 described in FIG. 3.

(Processing Procedure)

Next, an example of a procedure of processing performed by the RX 101 and the TX 102 will be described.

[Processing by Power Reception Apparatus]

Figure 5:
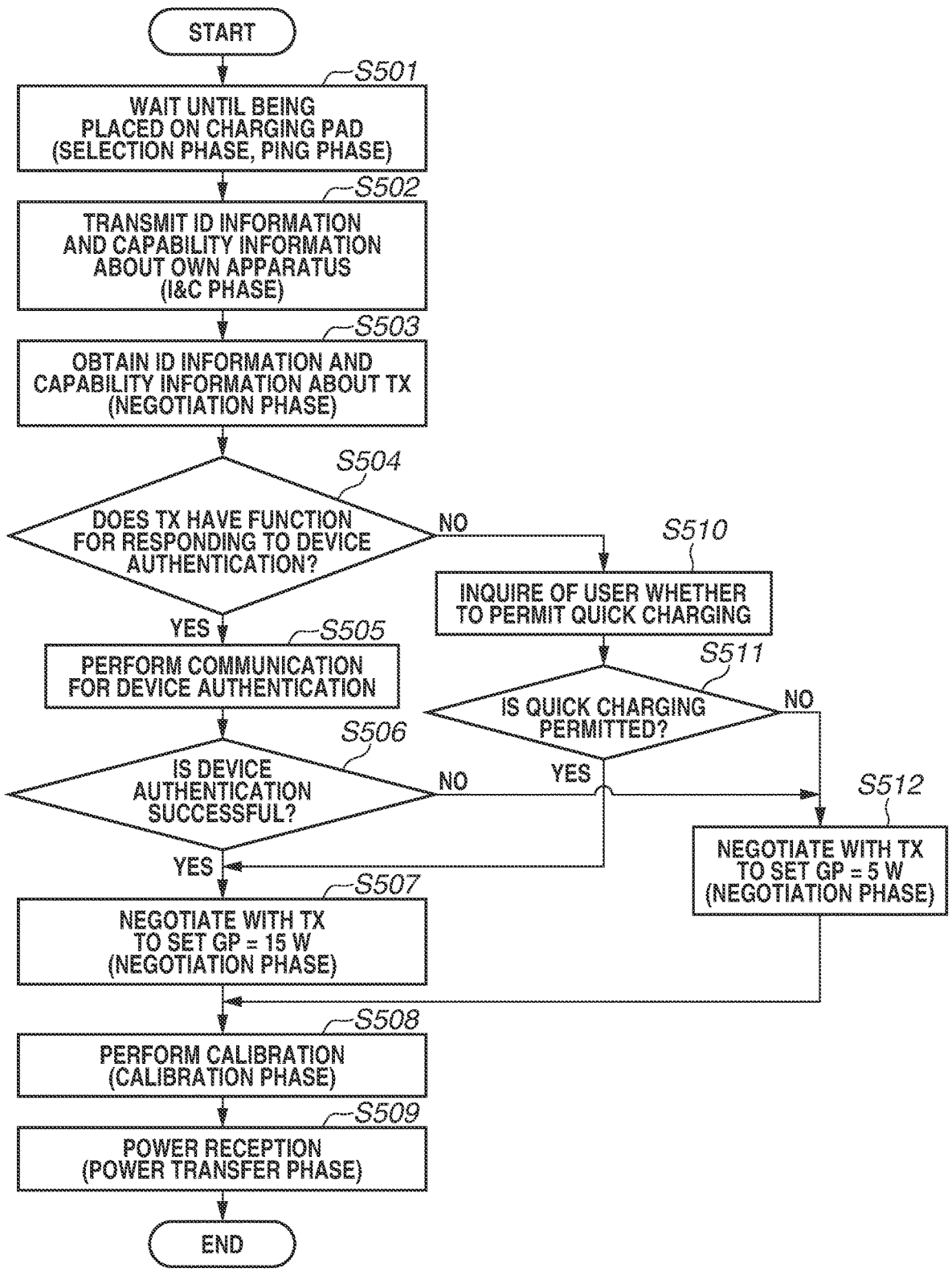
FIG. 5 is a flowchart illustrating an example of a procedure of processing by the power reception apparatus according to the first exemplary embodiment.

FIG. 5 is a flowchart illustrating an example of the procedure of processing performed by the RX 101. This processing can be implemented, for example, by the control unit 201 of the RX 101 executing a program read from the memory 210. The processing also includes processing by the authentication unit 207, the setting unit 213, and the obtaining unit 214. At least part of the procedure of the processing described below may be implemented by hardware. In such a case, the hardware may be implemented, for example, by automatically generating a dedicated circuit using a gate array circuit, such as an FPGA, according to a program for implementing the processing steps by using a predetermined complier. The processing can be executed in response to power-on of the RX 101, in response to activation of the RX 101 by feeding of power from the battery 202 or the TX 102, or in response to input of a start instruction for a wireless charging application by the user of the RX 101. The processing may also be started by other triggers.

After processing related to power transmission and reception is started, in step S501, the RX 101 performs processing defined as the selection phase and the ping phase in the WPC standard to wait until being placed on the charging pad 103. The RX 101 detects that the RX 101 is placed on the charging pad 103 of the TX 102, for example, by detecting a Digital Ping from the TX 102. Detecting the Digital Ping, the RX 101 transmits a Signal Strength Packet (received voltage value) to the TX 102.

In step S502, after detecting that the own apparatus (RX 101) is placed on the charging pad 103 of the TX 102, the RX 101 performs processing defined as the I&C phase in the WPC standard to transmit the ID information and the device configuration information (capability information) about the own apparatus to the TX 102.

Figure 10A:
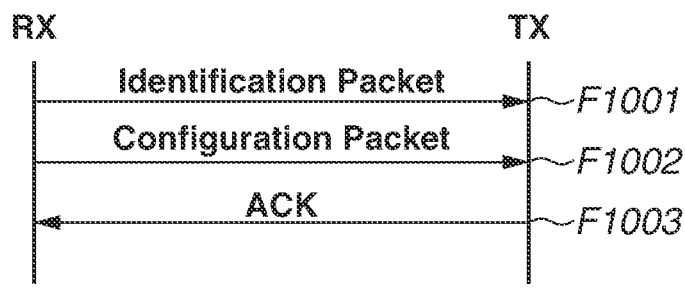
FIG. 10A is a diagram illustrating a communication sequence in an identification and configuration (I&C) phase.

FIG. 10A illustrates a communication procedure in the I&C phase. In the I&C phase, in step F1001, the RX 101 transmits an ID Packet to the TX 102. The ID Packet contains a Manufacturer Code and a Basic Device ID that are the ID information about the RX 101, as well as an information element from which a supported version of the WPC standard can be identified. The information element is capability information about the RX 101.

In step F1002, the RX 101 further transmits a Configuration Packet to the TX 102. The Configuration Packet includes the following information as capability information about the RX 101: a Maximum Power Value that is a value identifying the maximum power capable to be supplied to the load by the RX 101, and information indicating the presence or absence of a negotiation function according to the WPC standard.

In step F1003, after receiving the ID Packet and the Configuration Packet, and the TX 102 transmits an ACK. The I&C phase ends. The RX 101 may notify the TX 102 of the ID information and the device configuration information (capability information) about the RX 101 by using a method other than the communication in the I&C phase according to the WPC standard. The ID information about the RX 101 may be a Wireless Power Identifier according to the WPC standard, or other ID information from which each individual RX 101 can be identified. The capability information may include information other than the foregoing.

Return to FIG. 5. In step S503, the RX 101 obtains the ID information and the capability information about the TX 102 of the charging pad 103 on which the RX 101 is placed by communication in the negotiation phase. In step S504, the RX 101 determines whether the TX 102 has the function for responding to device authentication based on the obtained capability information.

Figure 10B:
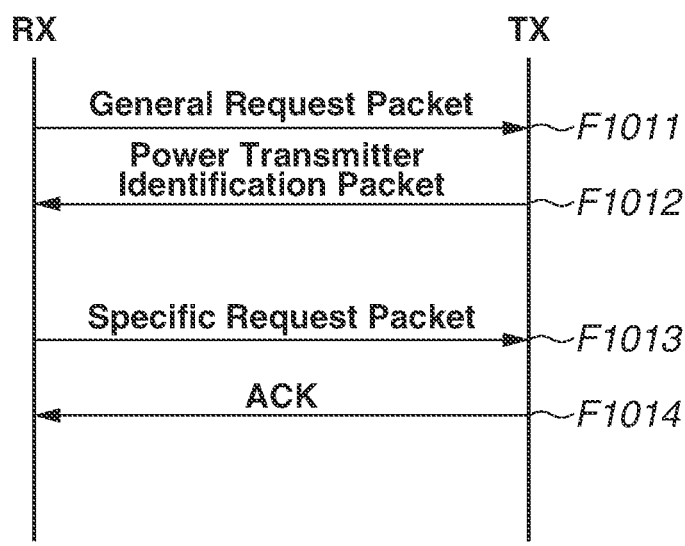
FIG. 10B is a diagram illustrating a communication sequence in a negotiation phase.

FIG. 10B illustrates the communication in the negotiation phase. In step F1011, the RX 101 transmits a General Request Packet. According to the WPC standard, a General Request Packet is for requesting various types of information of the other apparatus (in this case, the TX 102), and can specify the type of information to be requested. The RX 101 specifies a Power Transmitter Identification Packet as the type of information to be requested of the TX 102. In step F1012, the RX 101 obtains the Power Transmitter Identification Packet from the TX 102. The Power Transmitter Identification Packet includes a Major Version and a Minor Version that indicate the version of the WPC standard supported by the TX 102, and a Manufacturer Code that is ID information about the TX 102. If the version of the WPC standard supported by the TX 102 is a predetermined value or later, the RX 101 determines that the TX 102 has the function for responding to device authentication. The condition for the version comparison may be set in such a manner that the version coincides with the predetermined value, instead of being the predetermined value or later. The predetermined value may be the version of the WPC standard supported by the RX 101 itself. The RX 101 may determine whether the TX 102 has the function for responding to device authentication based on other information obtained from the TX 102. For example, the RX 101 obtains the capability information about the TX 102 from the TX 102 by using a Power Transmitter Capability Packet or a Proprietary Packet. The RX 101 may then determine whether the TX 102 has the function for responding to device authentication based on the contents of the capability information. The RX 101 may determine whether the TX 102 has the function for responding to device authentication based on whether a Manufacturer Code that is ID information about the TX 102 coincides with a predetermined value. The RX 101 may obtain the ID information and the capability information about the TX 102 by using a method other than the communication in the negotiation phase, and determine whether the TX 102 has the function for responding to device authentication based on the capability information.

Return to FIG. 5. A case where the RX 101 determines that the TX 102 has the function for responding to device authentication (YES in step S504) will be described. In such a case, the processing proceeds to step S505. In step S505, the RX 101 performs communication for device authentication by using the authentication unit 207.

Figure 10C:
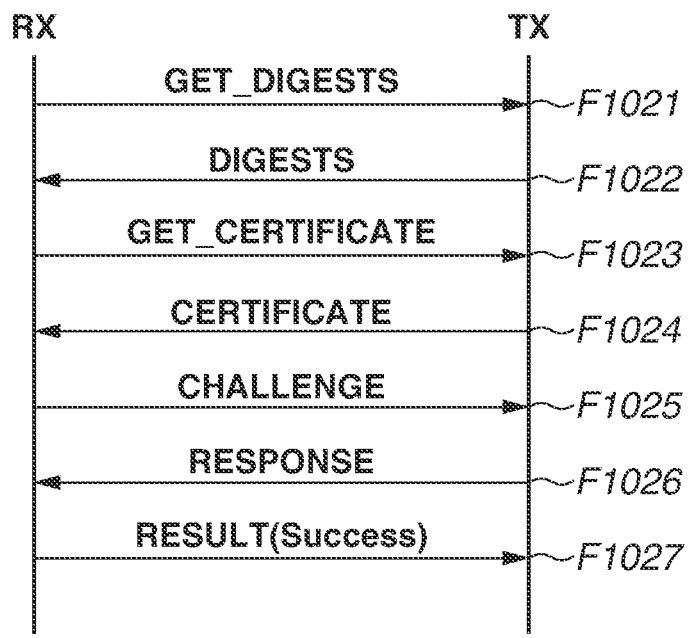
FIG. 10C is a diagram illustrating a communication sequence for device authentication.

The RX 101 operates as an initiator that transmits challenge text to the TX 102. The TX 102 operates as a responder that encrypts the challenge text received from the RX 101 and transmits the encrypted challenge text to the RX 101. In FIG. 10C, in step F1021, the RX 101 that is the initiator initially transmits a GET_DIGESTS message to the TX 102 that is the responder. A GET_DIGESTS message is for requesting information related to an electronic certificate that the receiving device (TX 102) has. In step F1022, the TX 102 transmits a DIGESTS to the RX 101 in response to the GET_DIGESTS message. A DIGESTS is information about the electronic certificate that the transmitting device (TX 102) has.

In step F1023, the RX 101 transmits a GET_CERTIFICATE message requesting detailed information about the electronic certificate to the TX 102. In step F1024, the TX 102 transmits a CERTIFICATE to the RX 101 in response to the GET_CERTIFICATE message from the RX 101. In step F1025, the RX 101 transmits a CHALLENGE message including challenge text to the TX 102. In step F1026, the TX 102 transmits a RESPONSE obtained by encrypting the challenge text received from the RX 101 to the RX 101. If the validity of the RESPONSE received from the TX 102 is confirmed, then in step F1027, the RX 101 transmits a RESULT(Success) to the TX 102. The device authentication ends. The RESULT(Success) represents that the validity of the RESPONSE is successfully confirmed and the device authentication is successful. On the other hand, if the device authentication fails, the RX 101 transmits a RESULT(Fail) instead of the RESULT(Success), and ends the communication for device authentication.

If the initiator (RX 101) receives no response in the process of communication, the RX 101 may perform a retry by transmitting the message for obtaining a response again, or determine that the device authentication fails. Alternatively, the RX 101 may determine that the partner apparatus does not have the function for responding to device authentication, and perform the processing like in the case of NO in step S504 of FIG. 5.

Return to FIG. 5. After the communication for device authentication, the RX 101 determines the result of the device authentication in step S506, and negotiates with the TX 102 based on the result in step S507 or S512. In step S506, if the device authentication is successful (YES in step S506), the processing proceeds to step S507. In step S507, the RX 101 negotiates with the TX 102 to set the GP to 15 W. If not (NO in step S506), the processing proceeds to step S512. In step S512, the RX 101 negotiates with the TX 102 to set the GP to 5 W. The RX 101 negotiates with the TX 102 using communication via the communication unit 206.

Such negotiation is performed by using a Specific Request Packet communicated in the negotiation phase (step F1013) and the corresponding ACK (step F1014) according to the WPC standard illustrated in FIG. 10B. In step F1013, the RX 101 notifies the TX 102 of the requesting GP value by transmitting the Specific Request Packet to the TX 102. Specifically, if the device authentication is successful, the RX 101 notifies the TX 102 that GP=15 W. If not, the RX 101 notifies the TX 102 that GP=5 W. The TX 102 determines whether to accept the request based on the power transmission capability of the TX 102. In step F1014, the TX 102 transmits an ACK (positive acknowledgement) to the RX 101 if the request is accepted, and a NACK (negative acknowledgment) if the request is not accepted. FIG. 10B illustrates an example where the TX 102 transmits an ACK.

If magnitude of the GP requested by the RX 101 falls within the power transmission capability of the TX 102, the TX 102 accepts the request performed by the RX 101. In this process, the value of the GP is determined to be the same as the value requested by the RX 101. Meanwhile, if the GP requested by the RX 101 has a magnitude not attainable by the power transmission capability of the TX 102, the TX 102 does not accept the request performed by the RX 101. In such a case, for example, a predetermined value defined in the WPC standard in advance can be determined as the value of the GP. Other predetermined values may be determined as the value of the GP. As an example, such predetermined values are stored in the memory 210 of the RX 101 and the memory 310 of the TX 102 in advance.

If the TX 102 can simultaneously transmit power to a plurality of the RXes 101 and is already transmitting power to another RX 101, the TX 102 may determine the value of the GP based on the current remaining capacity of power transmission by the TX 102 instead of the power transmission capability of the TX 102.

While the GP is described to be determined through negotiation in step S507 or S512, this is not restrictive. More specifically, the determination of the GP is not limited to that based on the communication in the negotiation phase according to the WPC standard, and a different procedure for determining the GP based on the result of the device authentication between the TX 102 and the RX 101 may be performed. For example, if the device authentication is not successful, the GP may be set to a predetermined value such as 5 W. If the RX 101 obtains information indicating that the TX 102 does not support the negotiation phase (for example, in step S502), the RX 101 may set the value of the GP to a predetermined value (for example, determined in advance in the WPC standard) such as 5 W without a negotiation. For example, if, in step S502, the RX 101 transmits a Configuration Packet including a Neg Bit=1 and no ACK is returned from the TX 102, the RX 101 may determine that the TX 102 does not support the negotiation phase. Without a negotiation, calibration in step S508 to be described below may be omitted. Specifically, if no negotiation is performed, the processing subsequent to step S502 may be omitted and the processing may proceed to step S508 or S509.

In step S508, after the determination of the GP, the RX 101 performs calibration based on the GP. The calibration refers to processing in which the TX 102 adjusts the correlation between the value of the transmitting power measured inside the TX 102 and the value of the received power measured in the RX 101, in terms of the power transmitted from the TX 102 to the RX 101. The TX 102 performs the calibration by processing in the calibration phase according to the WPC standard. If the value of the GP is smaller than a predetermined value, the processing in the calibration phase according to the WPC standard may be omitted.

In step S509, the RX 101 performs power reception. The power reception is performed by processing in the power transfer phase according to the WPC standard. The power reception may be performed up to a full charge, or may be ended at appropriate timing. Since conventional techniques can be applied to the calibration and power reception in steps S508 and S509, a detailed description thereof will be omitted here. The calibration and power reception may be performed by a method other than that of the WPC standard.

If the RX 101 is fully charged in the power transfer phase, the RX 101 transmits an End Power Transfer Packet according to the WPC standard to the TX 102. This stops the power transmission from the TX 102, and a series of processes for wireless charging ends. The RX 101 may then automatically power off, and the processing may return to step S501 upon the next power-on. By other starting triggers, such as the remaining battery level of the RX 101 dropping to or below a predetermined level, the processing may return to step S501.

Next, a case where the power transmission apparatus is the TX 402, i.e., the RX 101 determines that the power transmission apparatus does not have the function for responding to device authentication (NO in step S504) will be described. In such a case, the processing proceeds to step S510. In step S510, the RX 101 inquires of the user whether to permit quick charging, and sets a setting based on the user's operation. The setting is set by the notification unit 208 and the operation unit 209.

For example, if the RX 101 is a smartphone, the notification unit 208 is a liquid crystal screen, and displays a screen 1100 illustrated in FIG. 11 as a popup screen to notify and prompt the user to set a setting. The operation unit 209 is a touch panel integrated with the liquid crystal display, and obtains the user's setting by detecting which is touched on the screen 1100, "YES" or "NO". If "YES" is selected, the RX 101 sets a setting to permit quick charging. If "NO" is selected, the RX 101 sets a setting to not permit quick charging. The RX 101 may use the timer 211, and if neither "YES" nor "NO" is selected within a predetermined time after the screen 1100 is displayed, perform processing as in the case where "NO" is selected.

If the RX 101 is in a low power consumption operation state and the screen of the notification unit 208 is in an OFF state when making the notification, the RX 101 may end the low power consumption operation state and turn the screen of the notification unit 208 ON before performing the notification. This can reduce the possibility that the user misses the notification. As illustrated FIG. 11, the ID information about the TX 102 (charger) obtained in step S503 may be displayed on the screen 1100. If the Manufacturer Code is used as the ID information about the TX 102, the Manufacturer Code may be converted into a character string expressing the manufacturer and the character string may be displayed. Accordingly, the user can be informed of the manufacturer of the TX 102, and can thus easily determine whether to permit quick charging. The ID information about the TX 102 may be a product name or serial number of the TX 102, ID information about a piece of furniture or vehicle with which the TX 102 is integrated, or a combination of such pieces of ID information.

The screen 1100 may include a display indicating whether the TX 102 is successfully authenticated, or a display concerning risk and safety if the user permits quick charging. This enables the user to set whether to permit quick charging, based on more detailed information.

The foregoing description is just an example, and the contents of the displayed messages are not limited thereto. Audio and other methods may also be used. The RX 101 may be configured to store the setting set in step S510 in the memory 210 in association with the ID information about the TX 102 (charger), and if the TX 102 having the same ID information is detected the next time, refer to the stored setting while omitting the popup display and the user input. This can reduce the user's time and effort for operation if the same TX 102 is repeatedly used to charge the RX 101.

In step S511, if quick charging is permitted by the setting set in step S510 (YES in step S511), the processing proceeds to step S507. In steps S507, S508, and S509, the RX 101 negotiates with the TX 102 to set the GP to be 15 W, and performs calibration and power reception. If quick charging is not permitted (NO in step in step S511), the processing proceeds to step S512. In step S512, S508, and S509, the RX 101 negotiates with the TX 102 to set the GP to be 5 W, and performs calibration and power reception.

The processing by the RX 101 is summarized as follows: If the RX 101 is placed on the TX 102, the RX 101 determines whether the TX 102 has the function for responding to device authentication. If the TX 102 is determined to have the function for responding to device authentication, the RX 101 performs device authentication, and receives power based on the result of the device authentication. Meanwhile, if the TX 102 is determined to not have the function, the RX 101 receives power based on the setting set by the user instead of device authentication.

[Processing by Power Transmission Apparatus of FIG. 3]

Figure 6:
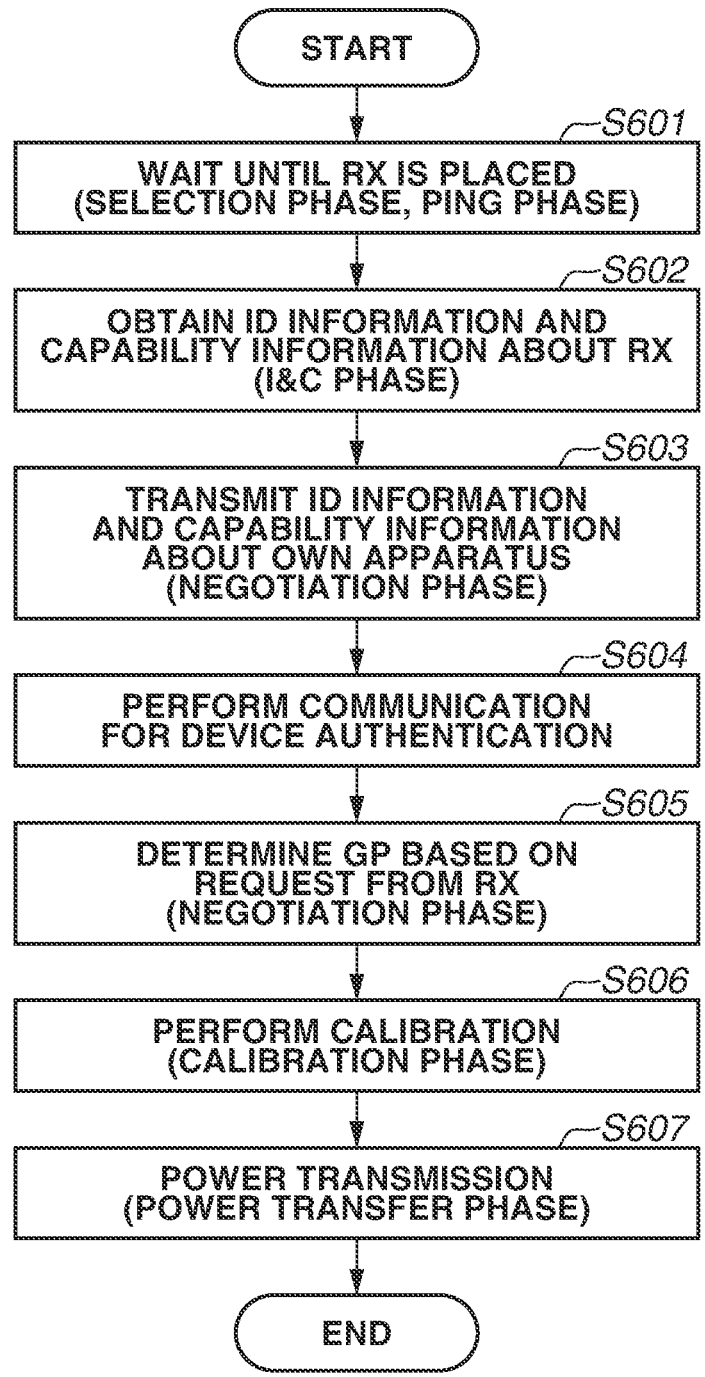
FIG. 6 is a flowchart illustrating an example of a procedure of processing by the power transmission apparatus according to the first exemplary embodiment.

Next, an example of a procedure of processing performed by the TX 102 will be described with reference to FIG. 6. This processing can be implemented, for example, by the control unit 301 of the TX 102 executing a program read from the memory 310. At least part of the following procedure may be implemented by hardware. In such a case, the hardware may be implemented, for example, by automatically generating a dedicated circuit using a gate array circuit, such as an FPGA, from a program for implementing the processing steps by using a predetermined complier. The processing can be executed in response to power-on of the TX 102, in response to input of a start instruction for a wireless charging application by the user of the TX 102, or in response to the TX 102 being connected to a commercial power supply and supplied with power. The processing may also be started by other triggers.

In step S601, the TX 102 initially performs processing defined as the selection phase and the ping phase in the WPC standard for processing related to power transmission and reception, and waits until the RX 101 is placed. Specifically, the TX 102 repeats to transmit an analog ping according to the WPC standard intermittently, and detects the presence or absence of an object placed on the charging pad 103. If the TX 102 detects that an object is placed on the charging pad 103, the TX 102 transmits a Digital Ping. If there is a predetermined response (Signal Strength Packet) to the digital ping, the TX 102 determines that the detected object is the RX 101 and that the RX 101 is placed on the charging pad 103.

In step S602, the TX 102 detecting the placement of the RX 101 performs communication in the foregoing I&C phase via the communication unit 306, and obtains the ID information and the device configuration information (capability information) from the RX 101. In step S603, the TX 102 transmits the ID information and the device configuration information (capability information) about the own apparatus (TX 102) to the RX 101. In step S604, the TX 102 performs the communication for device authentication described in FIG. 10C with the RX 101 by using the authentication unit 307. In step S605, the TX 102 performs the negotiation illustrated in FIG. 10B with the RX 101 via the communication unit 306, and determines the GP. In step S606, after the determination of the GP, the TX 102 performs calibration based on the GP. In step S607, the TX 102 transmits power to the RX 101.

If the TX 102 receives the End Power Transfer Packet according to the WPC standard from the RX 101, the TX 102 ends processing according to the WPC standard regardless of which processing phase the TX 102 is in, and returns to the selection phase of step S601. If the RX 101 is fully charged, the TX 102 also returns to the selection phase of step S601 since the End Power Transfer Packet is transmitted from the RX 101.

[Processing by Power Transmission Apparatus of FIG. 4]

Figure 7:
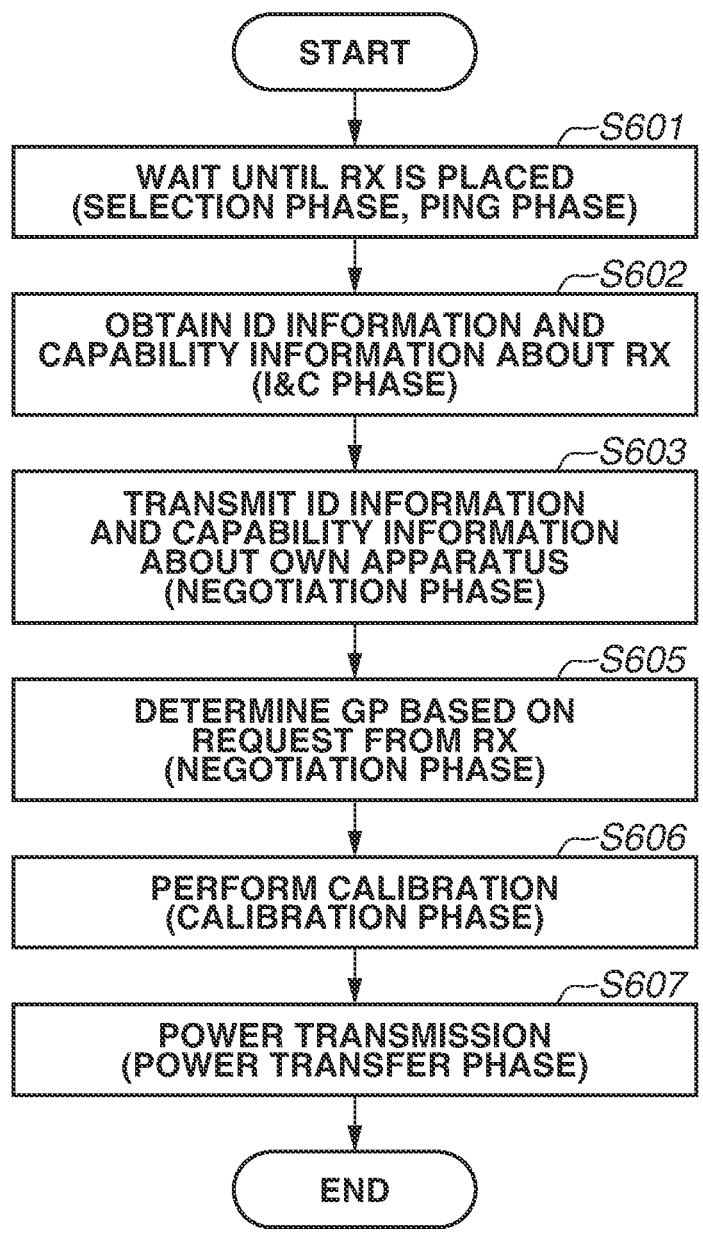
FIG. 7 is a flowchart illustrating an example of a procedure of processing by another power transmission apparatus according to the first exemplary embodiment.

FIG. 7 is a flowchart illustrating an example of a procedure of processing performed by the TX 402 illustrated in FIG. 4. Differences from the flowchart (FIG. 6) of the processing performed by the TX 102 of FIG. 3 will be described. In FIG. 7, similar steps to those of FIG. 6 are denoted by the same step numbers. In step S601 to S603, the TX 402 performs similar processing to that by the TX 102 of FIG. 3.

In step S605, the TX 402 of FIG. 4, not having the function for responding to device authentication, negotiates with the RX 101 without performing communication for device authentication, and determines the GP. The subsequent processing is similar to that described in FIG. 6.

[System Operation]

Figure 8:
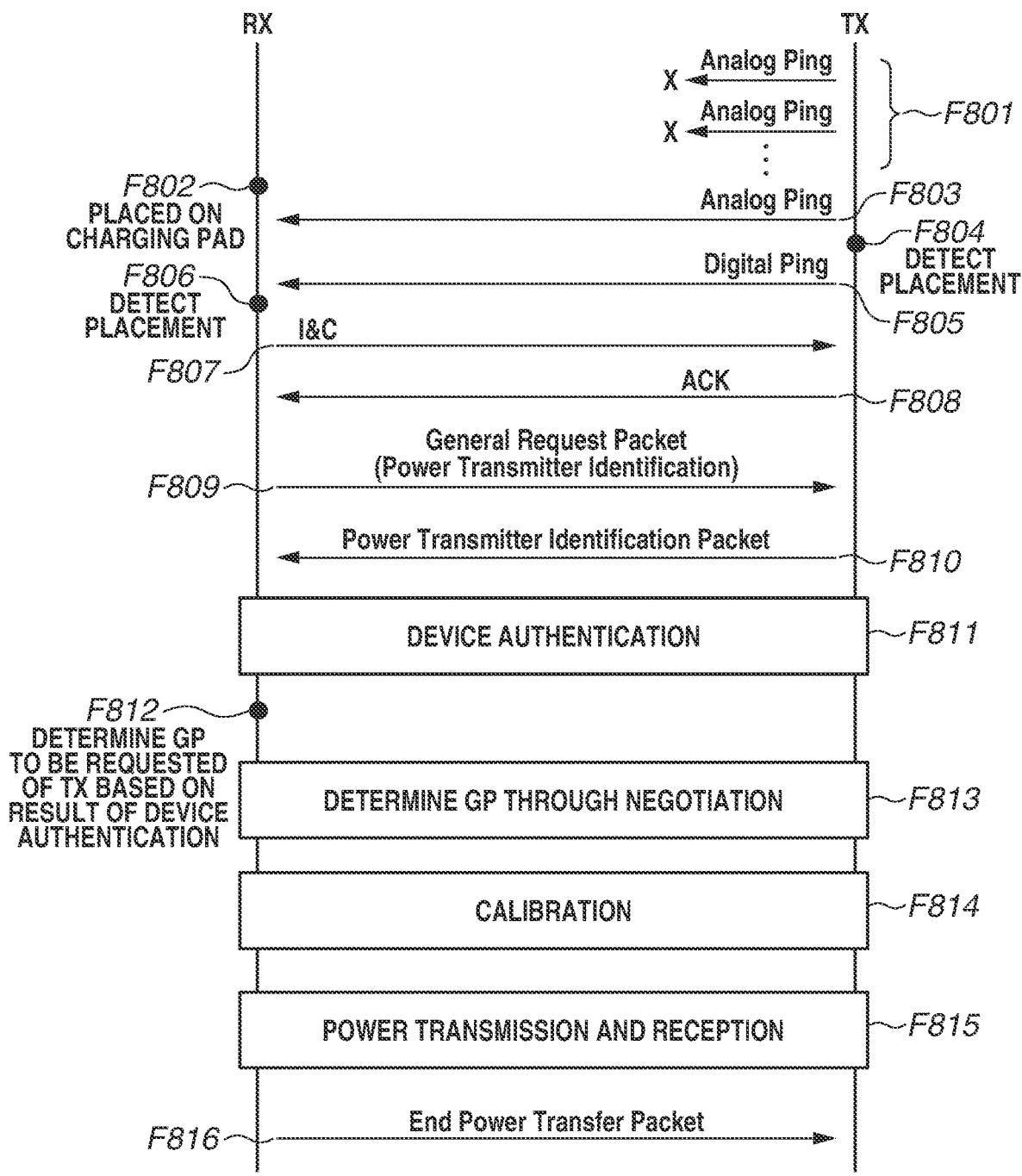
FIG. 8 is a diagram illustrating an example of a procedure of processing performed by the wireless charging system.

The operation sequence between the RX 101 and the TX 102 of FIG. 3, described with reference to FIGS. 5 and 6, will be described with reference to FIG. 8. As described above, the TX 102 includes the authentication unit 307 and has the function for responding to device authentication. In FIG. 8, time passes downward. In an initial state, the RX 101 is not placed on the charging pad 103.

In step F801 (step S601), the TX 102 initially transmits analog pings and waits until an object is placed on the charging pad 103. In step F802, the RX 101 is placed on the charging pad 103. In step F803, a change occurs in the analog ping. In step F804, the TX 102 detects the placement of an object. In steps F805 and F806, the RX 101 detects from the subsequent Digital Ping that the RX 101 is placed on the charging pad 103. The TX 102 detects from the response to the Digital Ping that the placed object is the RX 101. In steps F807 and F808 (steps S502 and S602), the RX 101 notifies the TX 102 of its ID information and device configuration information (capability information) by communication in the I&C phase. In steps F809 and F810 (step S503 and S603), the RX 101 and the TX 102 communicate a General Request Packet and a Power Transmitter Identification Packet in the negotiation phase. By this communication, the TX 102 notifies the RX 101 of its ID information and information from which whether the TX 102 has the function for responding to device authentication can be determined.

In step F811 (steps S504, S505, and S604), the RX 101 performs device authentication since the TX 102 has the function for responding to device authentication. In step F812 (step S506), the RX 101 determines the GP to be requested of the TX 102 based on the result of the device authentication. In step F813 (step S507 or S512 and step S605), the RX 101 and the TX 102 determine the GP through negotiation. In this case, the device authentication is successful and the GP is determined to be 15 W. In step F814 (steps S508 and S606), the RX 101 and the TX 102 perform calibration based on the determined GP. In step F815 (steps S509 and S607), the RX 101 and the TX 102 perform power transmission and reception. If the RX 101 is fully charged, then in step F816, the RX 101 transmits an End Power Transfer Packet. The series of processes ends.

By the operations described above, the RX 101 can receive high power if the RX 101 is placed on the charging pad 103 of the TX 102 having the function for responding to device authentication and the device authentication is successful.

Next, the operation sequence between the RX 101 and the TX 402 of FIG. 4, described with reference to FIGS. 5 and 7, will be described with reference to FIG. 9. As described above, the TX 402 does not include an authentication unit and does not have the function for responding to device authentication. Differences from FIG. 8 will mainly be described below.

Figure 9:
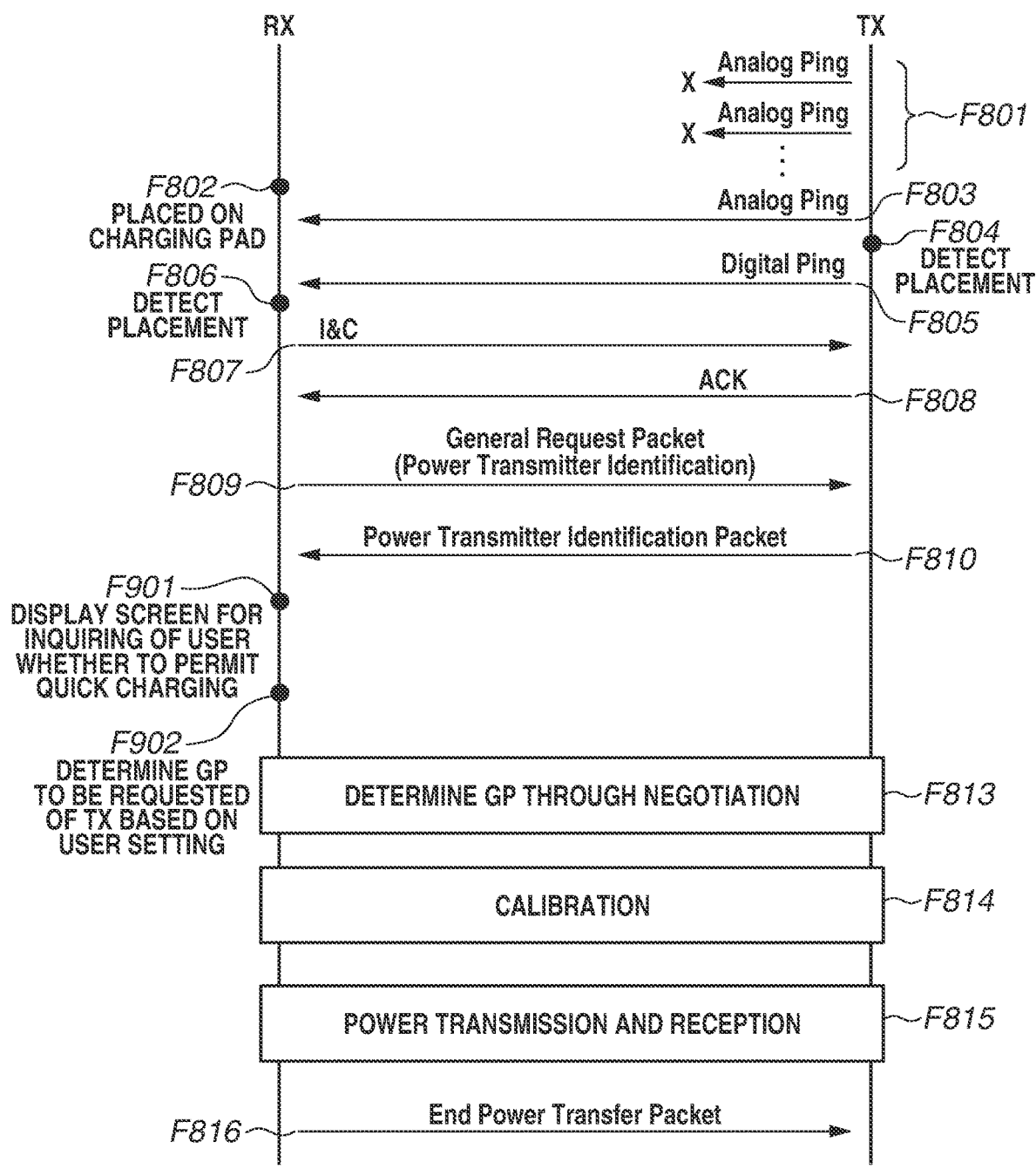
FIG. 9 is a diagram illustrating an example of a procedure of processing performed by another wireless charging system.

In FIG. 9, the processing of steps F801 to F810, including the selection phase, the I&C phase, and the notification of the information from which whether the TX 402 has the function for responding to device authentication can be determined, is similar to that of FIG. 8. Since the TX 402 does not have the function for responding to device authentication, the determination in step S504 is NO. In step F901 (step S511), the RX 101 displays the screen 1100 for inquiring of the user whether to permit quick charging. In step F902 (step S511, step S507 or S512, and step S605), the RX 101 determines the GP to be requested of the TX 102 based on the user setting set via the screen 1100. The subsequent operations are similar to those of FIG. 8.

According to the foregoing operations, if the RX 101 is placed on the charging pad 103 of the TX 402 not having the function for responding to device authentication, the RX 101 can receive high power based on the setting set by the user instead of performing device authentication.

As described above, the power reception apparatus according to the present exemplary embodiment determines power to be received from a power transmission apparatus having the function for responding to device authentication based on the result of the device authentication, and receives power based on the determined power. Specifically, if the device authentication is successful, the power reception apparatus can receive high power compared to the case where the device authentication fails. This, for example, can reduce or prevent troubles on the power reception apparatus due to reception of high power from an unauthorized device. Meanwhile, in receiving power from a power transmission apparatus not having the function for responding to device authentication, the power reception apparatus determines the power to be received based on a setting set by the user, and receives power based on the determined power. This enables reception of high power without performing device authentication if the power transmission apparatus does not have the function for responding to device authentication due to a difference in the version of the WPC standard and the user determines that high power can be received without problems.

A second exemplary embodiment describes a case where a power reception apparatus sets a setting in advance for situations where the power reception apparatus is placed on a charging pad of a power transmission apparatus not having the function for responding to device authentication, and determines power to be received based on the setting. An RX 101 according to the present exemplary embodiment is capable of setting whether to permit quick charging from a TX not having the function for responding to device authentication before the RX 101 is placed on the charging pad of the TX, and stores the setting set by the user.

Figure 13:
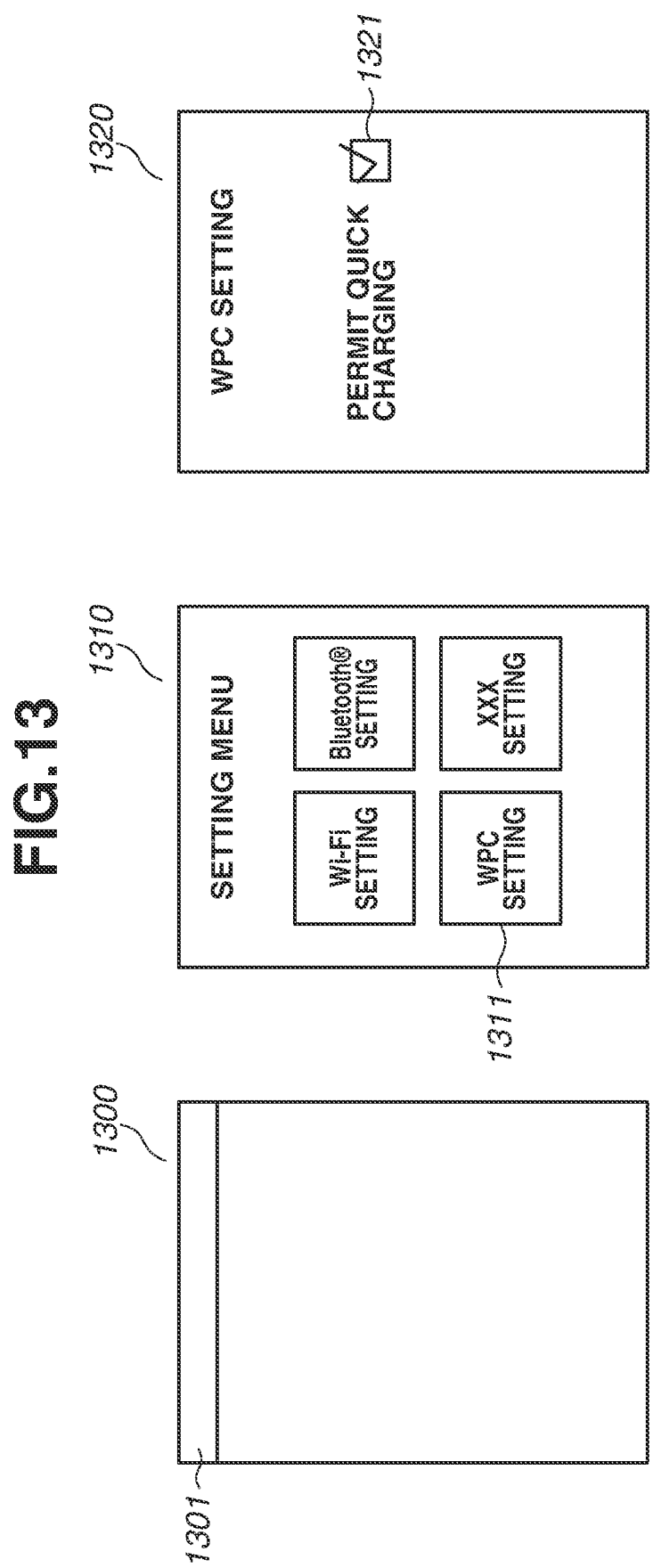
FIG. 13 is a diagram illustrating an example of a user interface of the power reception apparatus according to the second exemplary embodiment.

An example of the setting method here will be described with reference to FIG. 13. FIG. 13 illustrates a display example of a home screen 1300 of a smartphone. If the user performs a swipe operation on an area 1301 at the top of the home screen 1300, a setting menu 1310 opens. The setting menu 1310 displays a setting button 1311 related to an operation according to the WPC standard next to setting buttons related to other functions such as a wireless LAN function and a Bluetooth® function. If the setting button 1311 is tapped, a screen 1320 for setting whether to permit quick charging appears. The user can set whether to permit quick charging by checking or unchecking a checkbox 1321.

Figure 12:
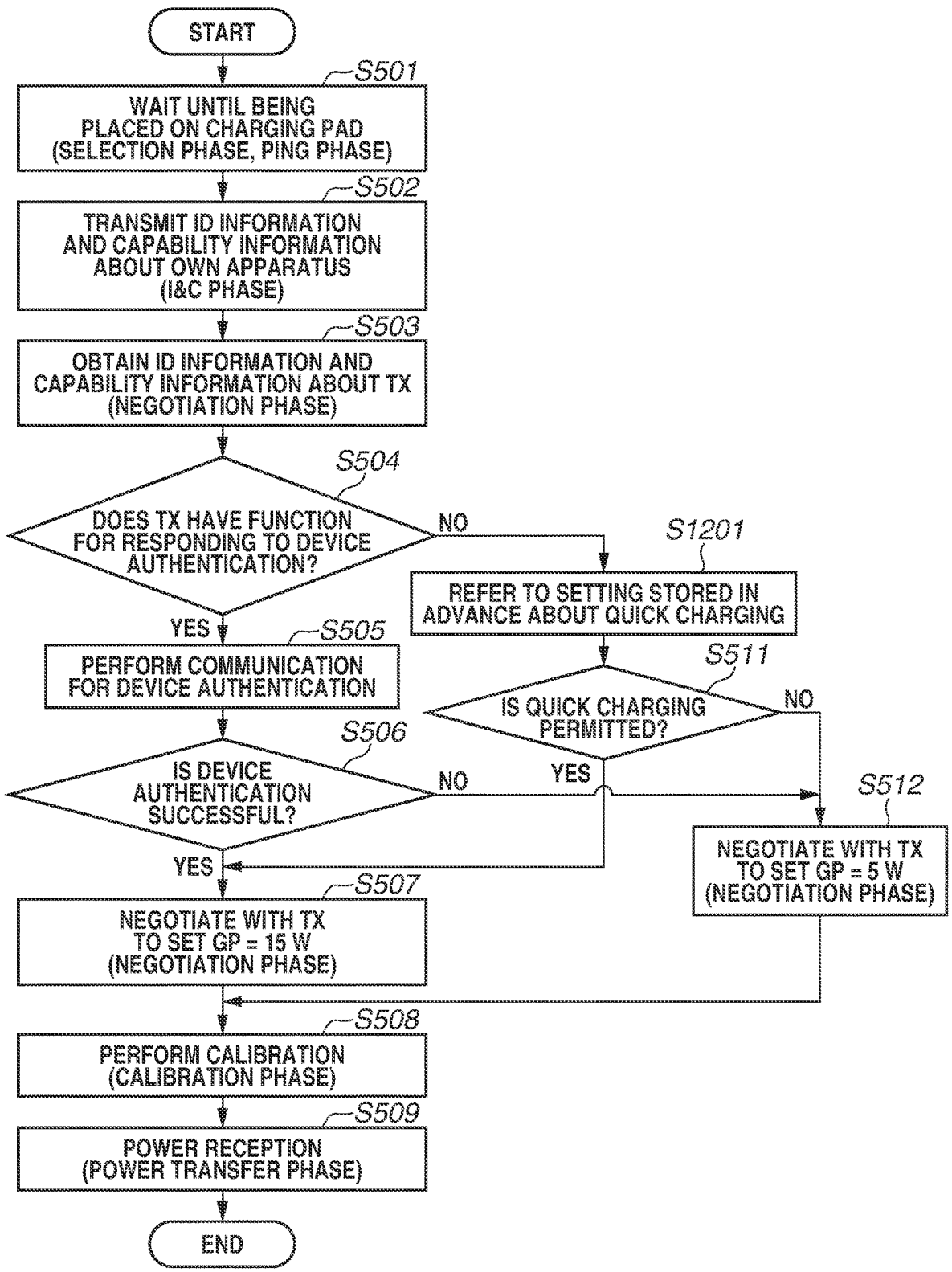
FIG. 12 is a flowchart illustrating an example of a procedure of processing by a power reception apparatus according to a second exemplary embodiment.

FIG. 12 is a flowchart illustrating a procedure of processing by the RX 101 according to the present exemplary embodiment. Differences from the first exemplary embodiment will be described below. The processing of steps S501 to S504 and the processing in the case where the TX is determined to have the function for responding to device authentication in step S504 (YES in step S504) are similar to in FIG. 5. If the TX is determined to not have the function for responding to device authentication (NO in step S504), the processing proceeds to step S1201. In steps S1201 and S511, the TX refers to the setting stored in advance and determines whether to permit quick charging. The subsequent processing is similar to that of FIG. 5.

As described above, the power reception apparatus according to the present exemplary embodiment can set a setting in advance for situations where the power reception apparatus is placed on the charging pad of a power transmission apparatus not having the function for responding to device authentication, and store the setting. In other words, since the user does not need to set a setting about whether to permit quick charging each time, the user's time and effort for operation can be reduced if the power transmission apparatus not having the function for responding to device authentication is repeatedly used to charge the power reception apparatus. In addition, the setting button 1311 related to charging is displayed on the same screen as the setting buttons related to other functions are, like the setting menu 1310 of FIG. 13. This makes easy to understand how to set the setting and improves usability for the user. The setting about whether to permit quick charging can be performed when the power reception apparatus is powered on for the first time. Then, the user can set the setting at any timing. For example, quick charging may be prohibited by a default setting, and in such a case where no user setting has been set by the time of step S201, the power reception apparatus may set the GP to 5 W based on the default setting. This can further reduce the user's time and effort for operation.

In the foregoing description, the example case where the setting about whether to permit quick charging is applied to only a power transmission apparatus not having the function for responding to device authentication is described. However, the setting may also be applied to a power transmission apparatus having the function for responding to device authentication. In such a case, the RX 101 may request GP=5 W regardless of the result of the device authentication in a period of time during which the setting to not permit quick charging is stored. This can prevent quick charging from any charger, for example, if higher priority is given to suppression of side effects from quick charging, such as deterioration of the battery, over reduction of the charging time.

In the foregoing description, in a case where the power transmission apparatus is determined to have the function for responding to device authentication in step S504, then in step S505, communication for device authentication is performed. However, the communication may be omitted, and the power reception apparatus may operate based on the advance setting about whether to perform quick charging. In such a case, the processing of steps S504 to S506 may be omitted, and the processing of step S1201 may be performed after the processing of step S503. If there is a setting to permit quick charging, the power reception apparatus can thus omit the communication for device authentication and receive up to 15 W of power when receiving power from a power transmission apparatus having the function for responding to device authentication. This can save the time to perform device authentication and further reduce the time for charging.

A third exemplary embodiment describes a case where a setting for a case in which a power reception apparatus is placed on a charging pad of a power transmission apparatus not having the function for responding to device authentication is performed for each power transmission apparatus, and the power reception apparatus determines power to be received based on the setting. An RX 101 according to the present exemplary embodiment allows the user to set a TX with which quick charging is permitted before the RX 101 is placed on the TX, and stores the setting set by the user.

Figure 15:
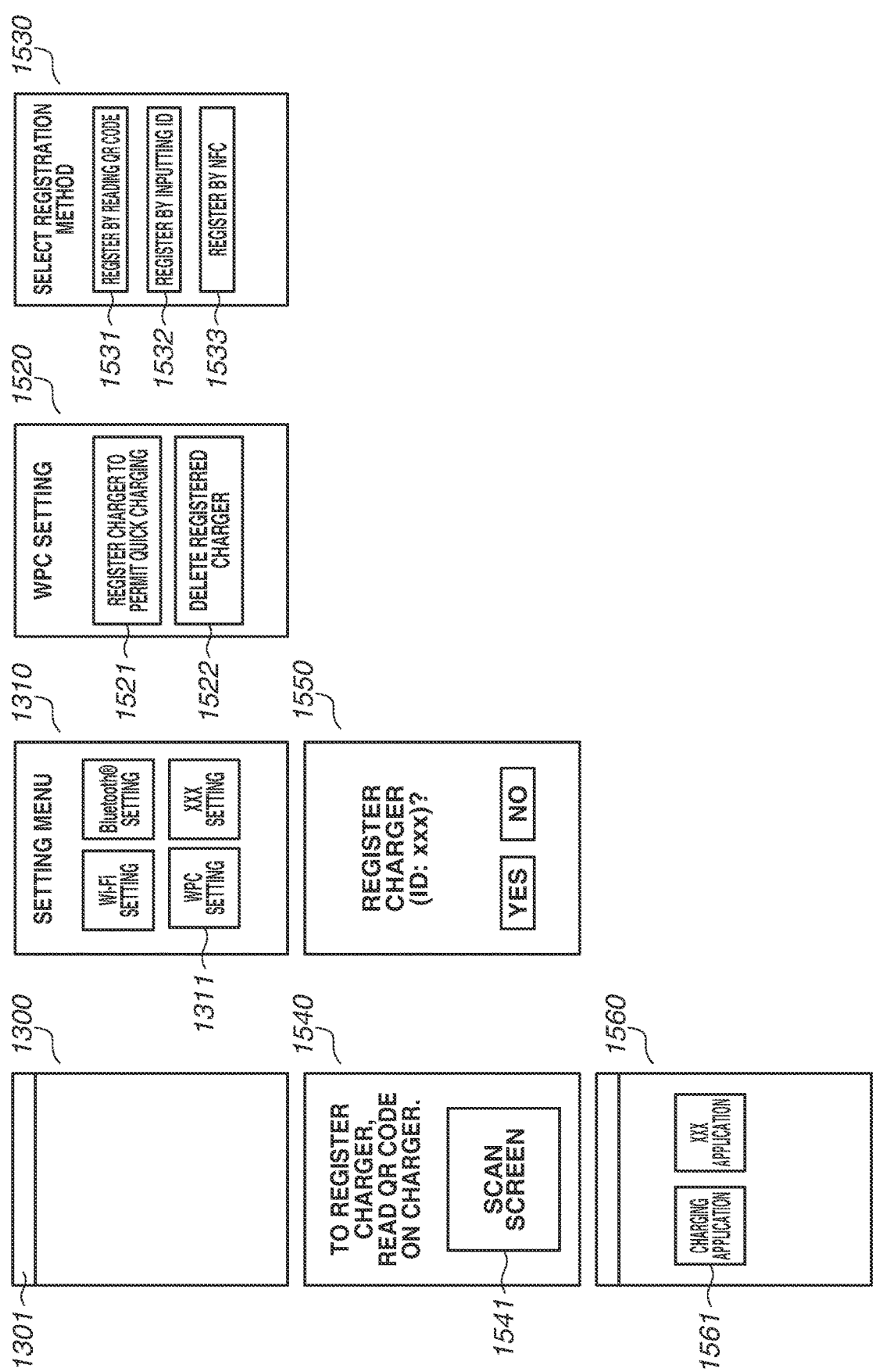
FIG. 15 is a diagram illustrating an example of a user interface of the power reception apparatus according to the third exemplary embodiment.

An example of the setting method here will be described with reference to FIG. 15. In the present exemplary embodiment, a Quick Response code (QR Code®) including ID information about a TX is attached to a charging pad 103 of the TX. A home screen 1300 and a setting menu 1310 are similar to those described in the second exemplary embodiment, illustrated in FIG. 13. If the setting button 1311 is tapped in the setting menu 1310, a setting screen 1520 is displayed. Alternatively, the setting screen 1520 may be displayed when a predetermined application icon 1561 in a home screen 1560 is tapped and the predetermined application is activated. If a button 1521 for registering a charger to permit quick charging is tapped on the setting screen 1520, the RX 101 displays a screen 1530 for selecting a registration method for registering the charger, and allows the user to select a registration method.

If a button 1531 is tapped, a screen 1540 appears to notify the user to read the QR code of the TX into a frame 1541 by using a camera of the smartphone. If the reading of the QR code is completed, a screen 1550 appears. If "YES" is selected, the RX 101 stores the ID information about the TX included in the read QR code into a memory 210. While an example of reading the ID information about the TX by using a QR code is described here, other code information such as a two-dimensional code other than a QR code and one-dimensional barcode may be used.

If a character string including the ID information about the TX is attached to the charging pad 103, the user taps a button 1532 on the screen 1530 to enter a screen (not illustrated) for the user to manually input the ID information. The ID information about the TX input by the user via the screen is then stored in the memory 210. If an NFC tag is attached to the charging pad 103 of the TX, the user taps a button 1533 to move to a screen (not illustrated) for giving an instruction for NFC reading. The ID information about the TX read via NFC by a user operation based on the instruction is then stored in the memory 210. Bluetooth® and other short-distance wireless communication may be used to read the ID information about the TX instead of NFC.

Figure 14:
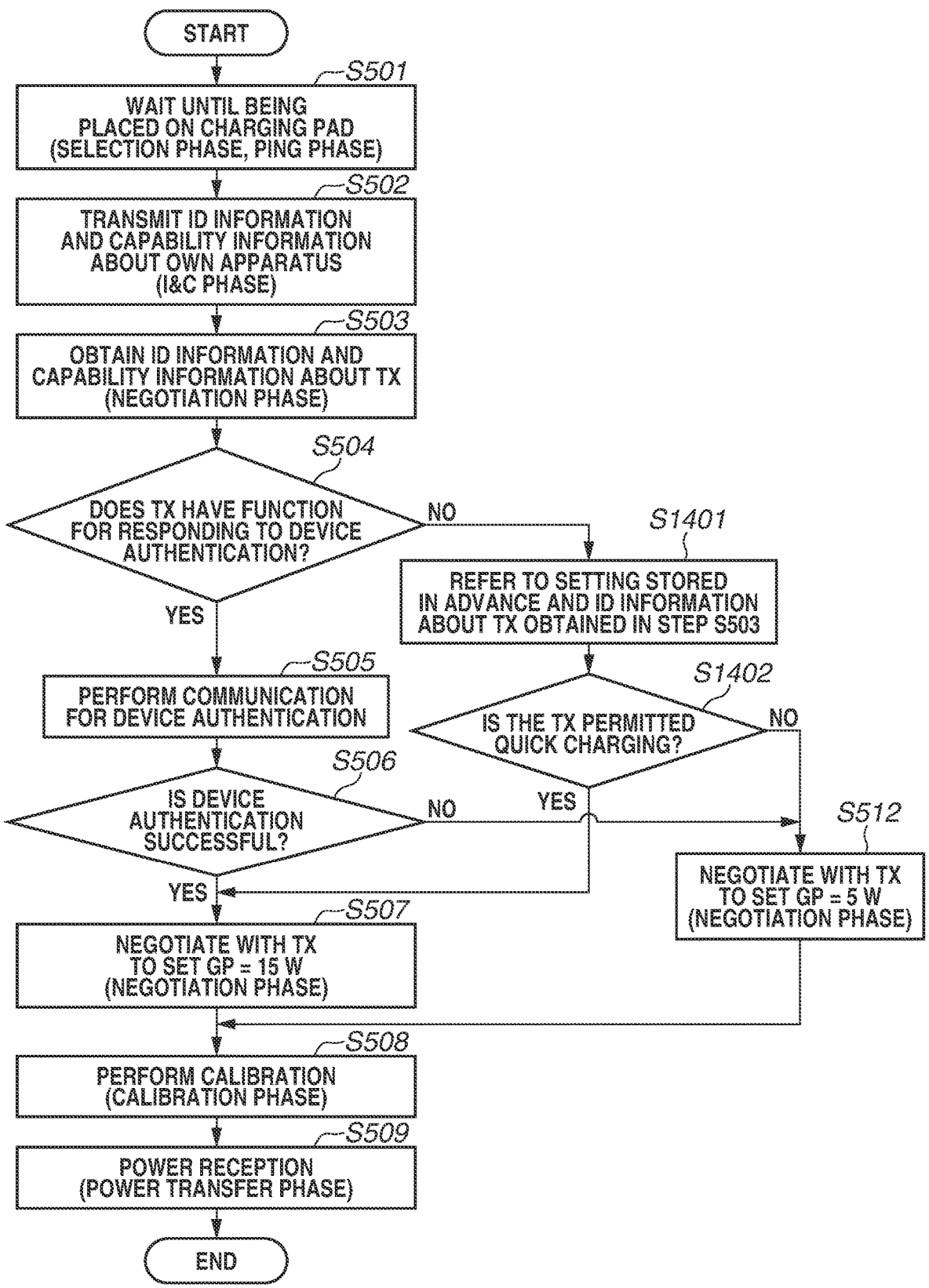
FIG. 14 is a flowchart illustrating an example of a procedure of processing by a power reception apparatus according to a third exemplary embodiment.

FIG. 14 is a flowchart illustrating a flow of processing by the RX 101 according to the present exemplary embodiment. Differences from the first and second exemplary embodiments will be described below.

The processing of steps S501 to S504 and the processing in the case where the TX is determined to have the function for responding to device authentication in step S504 (YES in step S504) are similar to in FIG. 5. If the TX is determined to not have the function for responding to device authentication (NO in step S504), the processing proceeds to step S1401. In steps S1401 and S1402, the RX 101 refers to the settings stored in advance and determines whether to permit quick charging. More specifically, if the ID information about the TX obtained in step S503 coincides with ID information about a TX stored in advance as a permitted TX for quick charging, the RX 101 determines that the TX of the charging pad 103 on which the RX 101 is currently placed is permitted quick charging. The subsequent processing is similar to that of FIG. 5.

As described above, the power reception apparatus according to the present exemplary embodiment can set a setting with respect to each power transmission apparatus for a case in which the power reception apparatus is placed on the charging pad of a power transmission apparatus not having the function for responding to device authentication, and store the setting. Since the user does not need to set a setting about whether to permit quick charging each time, the user's time and effort for operation can be reduced if the same power transmission apparatus not having the function for responding to device authentication is repeatedly used to charge the power reception apparatus. This enables, for example, an operation such as not performing quick charging with other than a power transmission apparatus having the function for responding to device authentication outside, and performing quick charging with a power transmission apparatus regularly used at home even if the power transmission apparatus does not have the function for responding to device authentication.

A fourth exemplary embodiment describes, as an application example of the third exemplary embodiment, a configuration where a setting about whether to permit quick charging is performed by a simple operation in a case where a TX is integrated with a vehicle such as an automobile.

Figure 16:
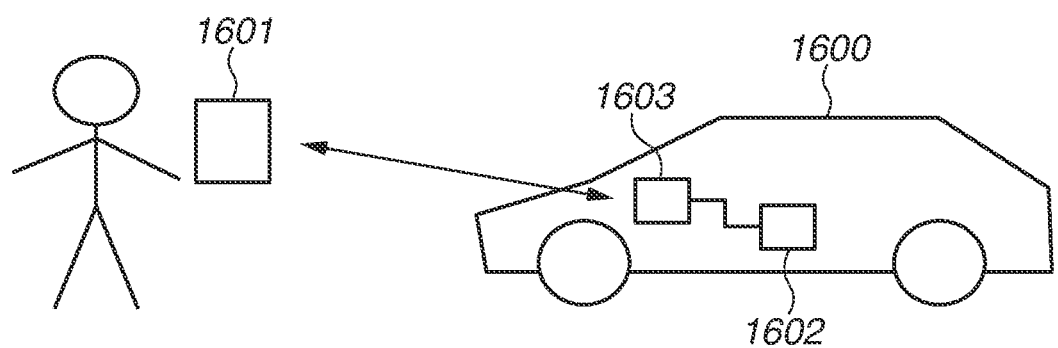
FIG. 16 is a diagram illustrating a configuration of a wireless charging system according to a fourth exemplary embodiment.

FIG. 16 is a diagram illustrating a system configuration according to the present exemplary embodiment. An RX 1601 is an electronic device that receives power wirelessly transmitted from a TX 1602 and charges a built-in battery. An example of the RX 1601 is a smartphone. The RX 1601 has a function of performing communication by a wireless communication method different from that of a communication unit 206. Using such a function, the RX 1601 communicates with a vehicle control unit 1603 of a vehicle 1600. Examples of the wireless communication method include a wireless LAN compliant with the IEEE 802.11 standard series (for example, Wi-Fi®), Bluetooth®, ZigBee, and NFC.

The TX 1602 is a power transmission apparatus integrally installed on the vehicle 1600. The TX 1602 is installed near a seat of the vehicle 1600 and can charge a smartphone placed on its charging pad by wireless power transfer. The TX 1602 has a function of performing quick charging at 15 W and does not have a function for responding to device authentication.

The vehicle control unit 1603 performs pairing with the RX 1601 that is the smartphone by the foregoing wireless communication, receives a command to unlock the doors of the vehicle 1600, and performs control based on the command. The pairing is performed by the user's confirmation operation. The RX 1601 and the vehicle control unit 1603 exchange and store each other's ID information by pairing, to recognize each other as devices that the user permits mutual communication. An example of the pairing method is Bluetooth® pairing. The pairing may be performed by using other methods.

The vehicle control unit 1603 stores ID information about the TX 1602, and notifies the RX 1601 of the ID information by the foregoing wireless communication during pairing. The vehicle control unit 1603 may store the ID information about the TX 1602 in a memory together with other information such as the body number of the vehicle 1600, or obtain the ID information from the TX 1602 by wired communication.

The RX 1601 can obtain the ID information about the TX 1602 by causing the user to execute pairing with the vehicle control unit 1603, and store the ID information as that about a TX permitted quick charging. In other respects, the processing is similar to that of the third exemplary embodiment.

As described above, whether to perform quick charging with the TX 1602 integrated with the vehicle 1600 can be set by a simple operation. Specifically, if the user performs a pairing operation for performing other controls such as unlocking of the doors, the ID information about the TX 1602 is also set. This can reduce the time and effort for operation since the operation for setting the ID information about the TX 1602 does not need to be performed separately.

Accordingly, the user can quickly charge the RX 1601 even if the TX 1602 does not have the function for responding to device authentication. In other words, without buying a new vehicle to replace the vehicle 1600 in the TX 1602 is integrated or installing another TX having the function for responding to device authentication on the vehicle 1600, quick charge to the RX 1601 can be performed in the vehicle 1600.

Next, another configuration of the TX integrated with the vehicle where the setting about whether to perform quick charging is performed by a simple operation will be described.

Figure 17:
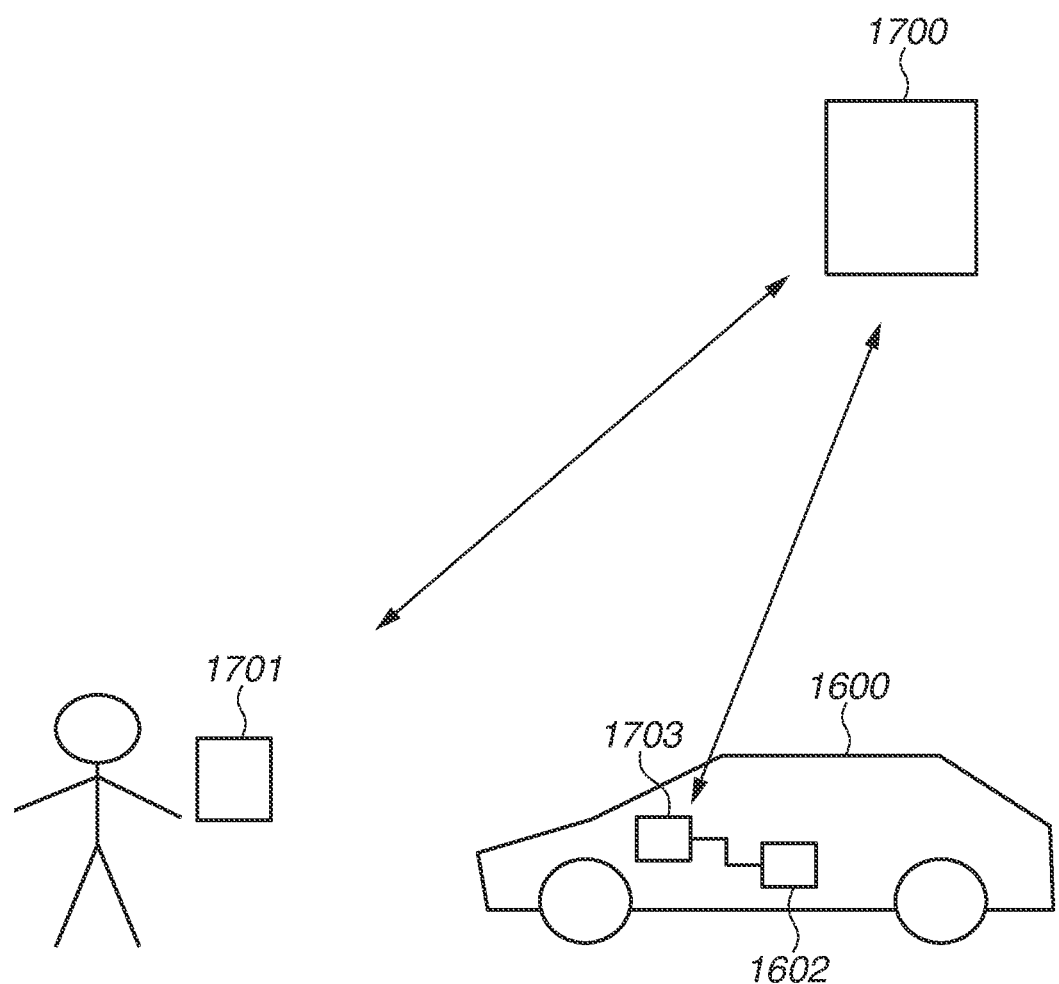
FIG. 17 is a diagram illustrating another configuration of the wireless charging system according to the fourth exemplary embodiment.

FIG. 17 is a diagram illustrating such a system configuration. An RX 1701 and a vehicle control unit 1703 communicate via a server 1700 on a network. To connect to the server 1700, the RX 1701 and the vehicle control unit 1703 may connect to the network via a base station, for example, by using Long-Term Evolution (LTE) standardized by the 3rd Generation Partnership Project (3GPP), or by using other communication methods.

The vehicle control unit 1703 notifies the server 1700 of information about the vehicle 1600. The information about the vehicle 1600 includes ID information about the TX 1702.

The information about the vehicle 1600 may also include other information such as a door locking state, the current position, and the mileage of the vehicle 1600.

The RX 1701 obtains the information about the vehicle 1600 by logging in to the server 1700, and obtains the ID information about the TX 1702 included in the information. The RX 1701 can then store the obtained ID information as the ID information about a TX permitted quick charging. While logging in to the server 1700, the RX 1701 can perform controls such as the unlocking of the doors of the vehicle 1600.

As described above, whether to perform quick charging with the TX 1702 integrated with the vehicle 1600 can be set by a simple operation. Specifically, if the user performs a log-in operation for performing other controls such as the unlocking of the doors, the ID information about the TX 1702 is also set. This can reduce the time and effort for operation since an operation for setting the ID information about the TX 1702 does not need to be performed separately.

Accordingly, the user can quickly charge the RX 1701 even if the TX 1702 does not have the function for responding to device authentication. In other words, without buying a new vehicle to replace the vehicle 1600 in the TX 1602 is integrated or installing another TX having the function for responding to device authentication on the vehicle 1600, quick charge to the RX 1601 can be performed in the vehicle 1600.

A fifth exemplary embodiment describes a configuration that displays a message that quick charging is not performed and the reason why quick charging is not performed if a TX 102 is incapable of device authentication and quick charging is not performed.

Figure 18:
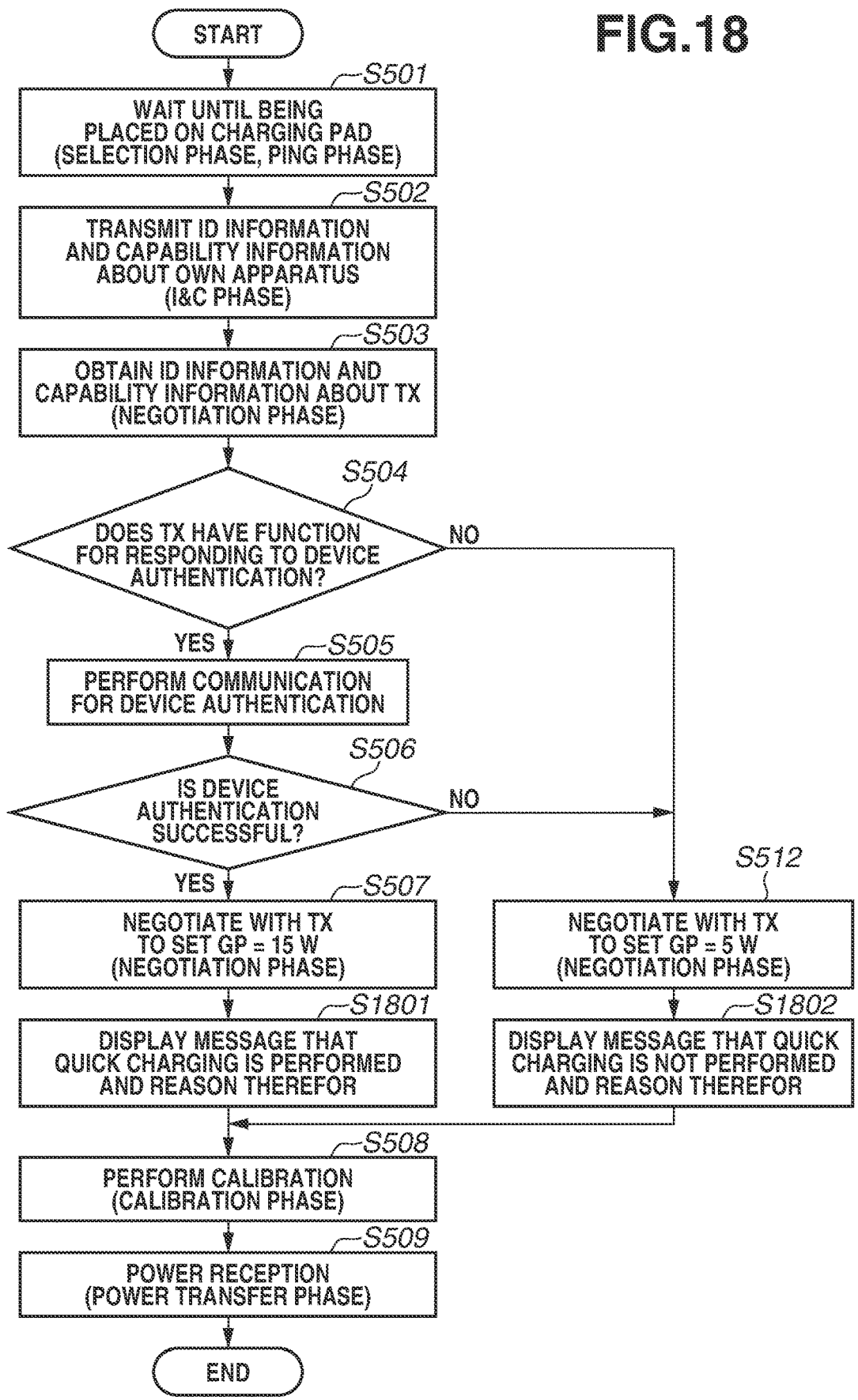
FIG. 18 is a flowchart illustrating an example of a procedure of processing by a power reception apparatus according to a fifth exemplary embodiment.

FIG. 18 is a flowchart illustrating a procedure of processing by an RX 101 according to the present exemplary embodiment. In FIG. 18, the processing of steps S501 to S504 is similar to that of the first exemplary embodiment. A description thereof will thus be omitted. If, in step S504, the TX 102 is determined to not have the function for responding to device authentication (NO in step S504), the processing proceeds to step S512. In step S512, the RX 101 negotiates with the TX 102 to set the GP to 5 W. In the present exemplary embodiment, a GP of 5 W is not the power corresponding to quick charging. In step S1802, the RX 101 displays the message that quick charging is not to be performed and the reason therefor by using the notification unit 208.

Figure 19:
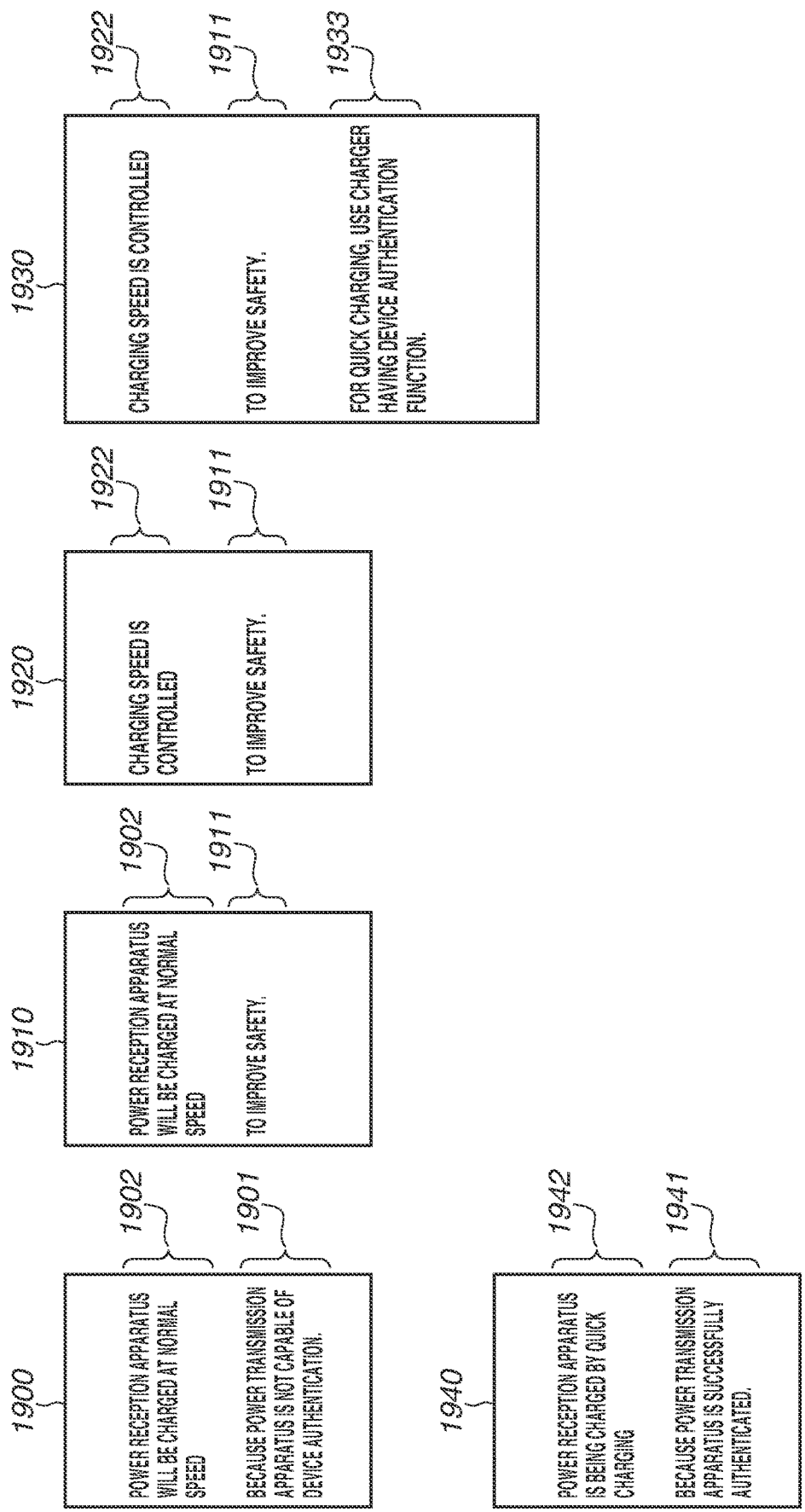
FIG. 19 is a diagram illustrating examples of display by the power reception apparatus according to the fifth exemplary embodiment.

FIG. 19 illustrates screens 1900, 1910, 1920, and 1930 that are examples of display by the notification unit 208 in step S1802. The screen 1900 includes a display 1902 related to a power reception operation that charging is performed at normal speed instead of quick charging, and a display 1901 related to the reason why the charging is performed at normal speed. In other words, the reason describes why lower power corresponding to normal charging is requested instead of the power corresponding to quick charging. The screen 1900 displays the reason that the TX 102 is not capable of device authentication. The reason may be displayed in the manner of describing a cause as in the display 1901, or in the manner of describing a purpose as illustrated in a display 1911 on the screen 1910. Specifically, the screen 1910 includes the display 1911 describing the purpose to improve safety. The notification unit 208 may perform a display indicating that the charging speed is controlled, like a display 1922 on a screen 1920, or perform a display describing measures to perform quick charging, like a display 1933 on a screen 1930. In other words, the display 1933 describes the measures that the user can take to request power corresponding to quick charging.

Return to FIG. 18. The processing of steps S508 and S509 after step S1802 is similar to that of the first exemplary embodiment, and therefore a redundant description thereof will thus be omitted. If the TX 102 has the function for responding to device authentication, performs communication for device authentication, and fails to be authenticated (YES in step S504, step S505, and NO in step S506), the RX 101 also performs the displays described in step S1802 without quick charging (step S512). In such a case, the result of the device authentication may be displayed.

If the RX 101 is successful in the device authentication of the TX 102 and performs quick charging (steps S501 to S507), the processing proceeds to step S1801. In step S1801, the RX 101 displays a message that quick charging is performed and the reason therefor. FIG. 19 illustrates a screen 1940 that is a display example in the case where quick charging is performed. The screen 1940 includes a display 1942 related to a power reception operation that quick charging is performed, and a display 1941 describing the reason that the device authentication on the TX 102 is successful. The processing of step S1801 may be omitted if quick charging is performed, whereas the processing of step S1802 is performed if quick charging is not performed. If quick charging is performed, the RX 101 may display the display 1942 related to the power reception operation that quick charging is performed, while omitting the display 1941 describing the reason therefor. The foregoing description is just an example, and the contents of the displayed messages are not limited thereto. The notification unit 208 may use other methods such as providing a voice notification, instead of displaying a message.

By the foregoing processing, the RX 101 can display a message that quick charging is not performed and the reason therefor if the TX 102 is not capable of device authentication and quick charging is not performed. This can prevent the user from mistaking it for a failure if quick charging is not performed in charging the RX 101 with a power transmission apparatus not having the function for responding to device authentication.

Figure 20:
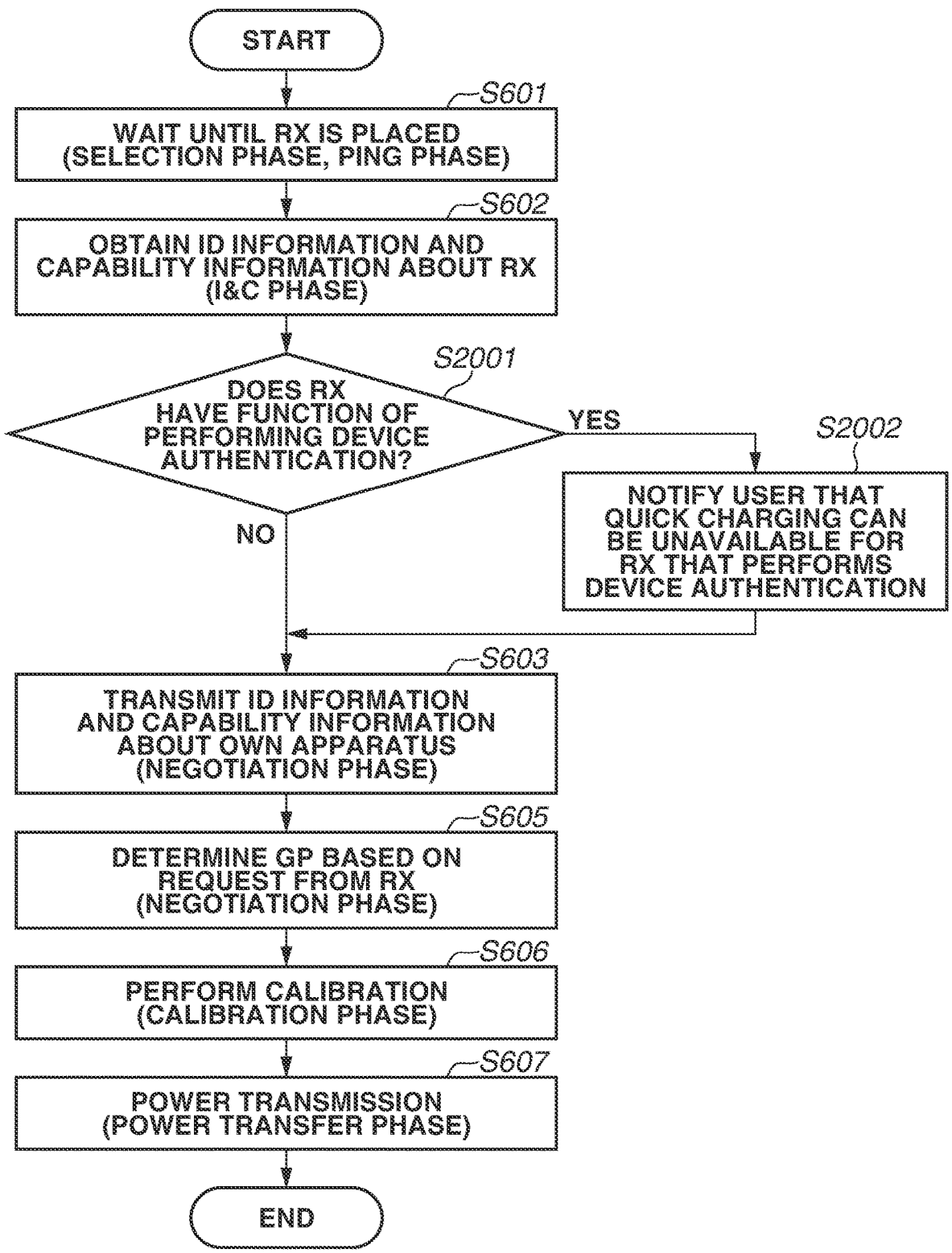
FIG. 20 is a flowchart illustrating an example of a procedure of processing by a power transmission apparatus according to a sixth exemplary embodiment.

A sixth exemplary embodiment describes a configuration that displays a message that quick charging by a TX not having the function for responding to device authentication can be unavailable for an RX 101 having the function of performing device authentication. FIG. 20 is a flowchart illustrating a procedure of processing by the TX according to the present exemplary embodiment. In steps S601 and S602 of FIG. 20, the TX performs processing for waiting for the placement of the RX 101 and processing for obtaining the ID information and capability information about the RX 101 as in FIG. 7. In step S2001, the TX determines whether the RX 101 has a function of performing device authentication based on the obtained capability information about the RX 101. This determination is performed, for example, by using the version number included in the ID Packet obtained by performing communication in the I&C phase according to the WPC standard in step S602. The TX may perform the determination based on other information. If the RX 101 is determined to not have the function of performing device authentication (NO in step S2001), the processing proceeds to step S603. The subsequent processing is similar to that of FIG. 7 according to the first exemplary embodiment, and therefore a redundant description thereof will thus be omitted. If the TX is unable to determine that the RX 101 does not have the function of performing device authentication (YES in step S2001), the processing proceeds to step S2002. In step S2002, the TX notifies the user via the notification unit 308 that quick charging can be unavailable for the RX 101 that performs device authentication.

FIG. 21 illustrates a screen 2100 that is an example of display performed by the notification unit 308 in step S2002. The screen 2100 displays a message informing the user that quick charging can be unavailable for an RX that performs device authentication. After step S2002, the processing proceeds to step S603. The subsequent processing is similar to that of FIG. 7 according to the first exemplary embodiment, and therefore a redundant description thereof will thus be omitted.

By the foregoing processing, the TX not having the function for responding to device authentication can display a message that quick charging can be unavailable for a power reception apparatus having the function of performing device authentication. This can prevent the user from mistaking it for a failure if quick charging is not performed in charging the power reception apparatus with a TX not having the function for responding to device authentication.

The determination processing of step S2001 may be omitted, and the display processing of step S2002 may be always performed after step S601.

Other Exemplary Embodiments

As described above, the power reception apparatus according to each of the foregoing exemplary embodiments controls reception of power lower than or equal to first power from a power transmission apparatus failed in device authentication, and permission of reception of second power higher than the first power from a power transmission apparatus successful in device authentication. In other words, the power reception apparatus can perform quick charging by receiving power from the power transmission apparatus successful in device authentication at maximum power higher than power from the power transmission apparatus failed in device authentication. If a setting to permit quick charging is performed based on the user's instruction, the power reception apparatus can receive the second power without device authentication. This enables the power reception apparatus to receive power from a power transmission apparatus not having the function for responding to device authentication at the same level of high power as power from the power transmission apparatus successful in device authentication.

In the foregoing description, in step S504, the power reception apparatus is described to determine whether the power transmission apparatus has the function for responding to device authentication, and only if the power transmission apparatus is determined to have the function, perform communication for device authentication. However, the power reception apparatus may start the communication for device authentication regardless of whether the power transmission apparatus has the function for responding to device authentication. In such a case, the authentication processing fails if the power transmission apparatus does not have the function for responding to device authentication. Then, if the authentication processing fails, the power reception apparatus may cause the user to set a setting about whether to permit quick charging as in the first exemplary embodiment, and determine the upper limit value of power to be received from the power transmission apparatus based on the user's instruction. As in the second to fourth exemplary embodiments, the setting for a case in which the authentication processing fails may be performed in advance, and if the authentication processing fails, the power reception apparatus may operate based on the setting. This can reduce the processing load of the power reception apparatus since the determination whether the power transmission apparatus has the function for responding to device authentication can be omitted.

In summary, the power reception apparatus according to each of the foregoing exemplary embodiments can request the first power of a power transmission apparatus failed in authentication, and request the second power higher than the first power of a power transmission apparatus successful in device authentication. Quick charging can thus be performed by requesting the power transmission apparatus successful in device authentication at power higher than power of the power transmission apparatus failed in device authentication. If a setting to permit quick charging is performed based on the user's instruction, the power reception apparatus can request transmission of the second power even if the power transmission apparatus does not have the function for responding to device authentication and the device authentication fails. The power reception apparatus can thus request transmission of power of the power transmission apparatus not having the function for responding to device authentication at the same level of high power as power of the power transmission apparatus having the function for responding to device authentication.

The power reception apparatus according to each of the foregoing exemplary embodiments is described to request GP=15 W of a successfully-authenticated power transmission apparatus, and GP=5 W of an authentication-failed power transmission apparatus. However, the power reception apparatus may be configured to not receive power if authentication fails. In such a case, if a power transmission apparatus is determined to not have the function for responding to device authentication, the power reception apparatus may inquire of the user whether to receive power from the power transmission apparatus, and determine whether to receive power based on the user's instruction. The user may set in advance whether to receive power from a power transmission apparatus not having the function for responding to device authentication, and the power reception apparatus may operate based on the setting. This can reduce the occurrence of troubles in the power reception apparatus due to power reception from an unauthorized device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

At least part of the processing illustrated in the flowcharts of FIGS. 5 to 7, 12, 14, 18, and 20 may be implemented by hardware. In the case of hardware implementation, for example, a dedicated circuit can be automatically generated on an FPGA by a program for implementing the processes by using a predetermined complier. Like an FPGA, a gate array circuit may be formed for hardware implementation.

According to an exemplary embodiment, power can be received from a power transmission apparatus not having the function for responding to device authentication at the same level of high power as power from a power transmission apparatus successful in device authentication is successful.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-091383, filed May 14, 2019, and No. 2020-022904, filed Feb. 13, 2020, which are hereby incorporated by reference herein in their entirety.

What is claimed is:

1. A power reception apparatus comprising:
   a reception unit configured to wirelessly receive power from a power transmission apparatus;
   a determination unit configured to determine whether the power transmission apparatus has a function for responding to authentication, the authentication including processing for communicating information related to a certificate;
   an authentication unit configured to perform the authentication on the power transmission apparatus in a case where the determination unit determines that the power transmission apparatus has the function for responding to authentication;
   a negotiation unit configured to negotiate with the power transmission apparatus to determine guaranteed power such that the guaranteed power is first power in a case where the authentication on the power transmission apparatus fails, such that the guaranteed power is second power higher than the first power in a case where the authentication on the power transmission apparatus successfully passes, and such that the guaranteed power is third power in a case where the power transmission apparatus does not have the function for responding to the authentication, wherein the third power can be set higher than the first power.

2. The power reception apparatus according to claim 1, wherein the third power is set to the first power or the second power.

3. The power reception apparatus according to claim 1, further comprising
   an obtaining unit configured to obtain information for determining whether the power transmission apparatus has the function for responding to the authentication,
   wherein the determination unit is configured to determine whether the power transmission apparatus has the function for responding to the authentication, based on the information obtained by the obtaining unit.

4. The power reception apparatus according to claim 3, wherein the information obtained by the obtaining unit includes information representing a version of a standard related to wireless power transfer.

5. The power reception apparatus according to claim 1, further comprising
   a display unit configured to display, in a case where the power transmission apparatus does not have the function for responding to the authentication, an image for inquiring to a user whether to permit the power reception apparatus to request the second power to the power transmission apparatus,
   wherein the negotiation unit sets the third power based on a user's instruction.

6. The power reception apparatus according to claim 5, wherein the image displayed by the display unit displays information for identifying the power transmission apparatus.

7. The power reception apparatus according to claim 1, wherein the third power set based on a user's instruction.

8. The power reception apparatus according to claim 7, wherein identification information of the power transmission apparatus for which a request for the second power is permitted is stored.

9. The power reception apparatus according to claim 8, wherein the identification information about the power transmission apparatus for which the request for the second power is permitted is obtained by at least one of the following methods: reading of code information, manual input by a user, and reading by short-range wireless communication.

10. The power reception apparatus according to claim 1, wherein the authentication unit is configured to perform the authentication on the power transmission apparatus by performing challenge-response communication using a certificate.

11. The power reception apparatus according to claim 1, further comprising a notification unit configured to perform, in a case where the authentication fails or in a case where the power transmission apparatus does not have the function for responding to the authentication, a notification that the authentication has failed or that the power transmission apparatus does not have the function for responding to the authentication.

12. A non-transitory computer-readable storage medium storing a program for causing a computer to operate as a power reception apparatus comprising:
   a reception unit configured to wirelessly receive power from a power transmission apparatus;
   a determination unit configured to determine whether the power transmission apparatus has a function for responding to authentication, the authentication including processing for communicating information related to a certificate;
   an authentication unit configured to perform the authentication on the power transmission apparatus in a case where the determination unit determines that the power transmission apparatus has the function for responding to authentication;
   a negotiation unit configured to negotiate with the power transmission apparatus to determine guaranteed power such that the guaranteed power is first power in a case where the authentication on the power transmission apparatus fails, such that the guaranteed power is second power higher than the first power in a case where the authentication on the power transmission apparatus successfully passes, and such that the guaranteed power is third power in a case where the power transmission apparatus does not have the function for responding to the authentication, wherein the third power can be set higher than the first power.

13. The power reception apparatus according to claim 1, wherein the guaranteed power is power guaranteed to be output to a load of the power reception apparatus.

14. The power reception apparatus according to claim 1, further comprising
   a display unit configured to display, in a case where the power transmission apparatus does not have the function for responding to the authentication and identification information of the power transmission apparatus is not stored, an image for inquiring to a user whether to permit the power reception apparatus to request the second power to the power transmission apparatus,
   a storage controlling unit configured to cause a storage to store the identification information of the power transmission apparatus for which a request for the second power is permitted.

15. A method for controlling a power reception apparatus configured to wirelessly receive power from a power transmission apparatus, the method comprising:
   determining whether the power transmission apparatus has a function for responding to authentication, the authentication including processing for communicating information related to a certificate;
   performing the authentication on the power transmission apparatus in a case where the power transmission apparatus has the function for responding to authentication;
   negotiating with the power transmission apparatus to determine guaranteed power such that the guaranteed power is first power in a case where the authentication on the power transmission apparatus fails, such that the guaranteed power is second power higher than the first power in a case where the authentication on the power transmission apparatus successfully passes, and such that the guaranteed power is third power in a case where the power transmission apparatus does not have the function for responding to the authentication, wherein the third power can be set higher than the first power.

* * * * *